US011933882B2

(12) United States Patent
Turbide et al.

(10) Patent No.: US 11,933,882 B2
(45) Date of Patent: Mar. 19, 2024

(54) METHOD AND SYSTEM FOR DETECTION AND SYNTHETIC APERTURE IMAGING OF A TARGET

(71) Applicant: INSTITUT NATIONAL D'OPTIQUE, Quebec (CA)

(72) Inventors: Simon Turbide, Quebec (CA); Linda Marchese, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 103 days.

(21) Appl. No.: 16/992,490

(22) Filed: Aug. 13, 2020

(65) Prior Publication Data

US 2021/0055412 A1  Feb. 25, 2021

Related U.S. Application Data

(60) Provisional application No. 62/889,080, filed on Aug. 20, 2019.

(51) Int. Cl.
*G01S 13/90* (2006.01)

(52) U.S. Cl.
CPC ....... *G01S 13/9005* (2013.01); *G01S 13/9011* (2013.01); *G01S 13/9017* (2013.01);
(Continued)

(58) Field of Classification Search
CPC ............. G01S 13/9005; G01S 13/9011; G01S 13/9017; G01S 13/9041; G01S 13/9054;
(Continued)

(56) References Cited

U.S. PATENT DOCUMENTS

| 6,864,828 B1 * | 3/2005 | Golubiewski ........... G01S 13/87 |
| | | 342/25 C |
| 7,397,418 B1 * | 7/2008 | Doerry .................... G01S 7/295 |
| | | 342/25 R |

(Continued)

FOREIGN PATENT DOCUMENTS

| CA | 2971055 A1 * | 8/2018 | ............. G01S 17/26 |
| CN | 108020824 B  * | 8/2021 | ............. G01S 17/90 |

(Continued)

*Primary Examiner* — Bernarr E Gregory
*Assistant Examiner* — Juliana Cross
(74) *Attorney, Agent, or Firm* — Fitch, Even, Tabin & Flannery LLP

(57) ABSTRACT

A method and a system for detection and synthetic aperture (SA) imaging of a target are disclosed. The method may include illuminating a scene with a search signal transmitted from a moving platform, receiving a search return signal from a target present in the scene, and estimating, from the search return signal, the range and the angular location of the target. The method may also include generating an SA transmission signal and a local oscillator (LO) signal with a time delay therebetween based on the estimated range, and illuminating the scene with the SA transmission signal pointed along an imaging direction based on the estimated angular location of the target. The method may further include receiving an SA return signal from the target, mixing the SA return signal with the LO signal to generate SA signal data, and generating an SA image of the target from the SA signal data.

18 Claims, 9 Drawing Sheets

(52) U.S. Cl.
CPC ...... *G01S 13/9041* (2019.05); *G01S 13/9054* (2019.05); *G01S 13/9056* (2019.05)

(58) Field of Classification Search
CPC ...... G01S 13/9056; G01S 17/90; G01S 17/89; G01S 17/42; G01S 7/4817; G01S 7/497; G01S 7/4815; G01S 7/4816; G01S 7/4863; G01S 17/10; G01S 7/484; G01S 17/931; G01S 7/4812; G01S 7/4814; G01S 7/486; G01S 17/04; G01S 17/93; G01S 7/4808; G01S 17/34; G01S 7/4868; G01S 7/4876; G01S 7/4811; G01S 7/4818; G01S 7/4972; G01S 17/58; G01S 7/4861
See application file for complete search history.

(56) References Cited

U.S. PATENT DOCUMENTS

| | | | | |
|---|---|---|---|---|
| 7,894,042 | B2* | 2/2011 | Turner | G01S 7/4811 356/5.1 |
| 8,767,187 | B2* | 7/2014 | Coda | G01S 17/58 356/3.01 |
| 8,805,005 | B2* | 8/2014 | Jahangir | G01S 13/9029 348/169 |
| 9,846,229 | B1* | 12/2017 | Doerry | G01S 13/9019 |
| 11,249,192 | B2* | 2/2022 | Crouch | G01S 13/343 |
| 2002/0005942 | A1* | 1/2002 | Perry | F41G 7/263 356/5.04 |
| 2004/0150547 | A1* | 8/2004 | Suess | G01S 13/90 342/25 A |
| 2005/0057654 | A1* | 3/2005 | Byren | G01S 17/90 348/169 |
| 2012/0119943 | A1* | 5/2012 | Bergeron | G01S 13/904 367/87 |
| 2012/0218140 | A1* | 8/2012 | Bergeron | G01S 15/8997 342/25 A |
| 2012/0229331 | A1* | 9/2012 | Bergeron | G01S 13/9005 342/25 C |
| 2012/0319892 | A1* | 12/2012 | Calabrese | G01S 13/9023 342/25 C |
| 2013/0176167 | A1* | 7/2013 | Bergeron | G02B 27/58 342/25 F |
| 2014/0209798 | A1* | 7/2014 | Woodward | G02B 6/04 250/227.28 |
| 2016/0084946 | A1* | 3/2016 | Turbide | G01S 7/497 356/4.01 |
| 2016/0131753 | A1* | 5/2016 | Brown | G01S 13/931 342/128 |
| 2018/0241477 | A1* | 8/2018 | Turbide | G01S 7/497 |
| 2018/0348361 | A1* | 12/2018 | Turbide | G01S 13/9023 |
| 2019/0049588 | A1* | 2/2019 | Turbide | G01S 17/08 |
| 2019/0129016 | A1* | 5/2019 | Halmos | G01S 17/26 |
| 2019/0196005 | A1* | 6/2019 | Calabrese | G01S 7/4021 |
| 2020/0142056 | A1* | 5/2020 | Fox | G01S 13/90 |
| 2020/0182978 | A1* | 6/2020 | Maleki | G01S 17/42 |

FOREIGN PATENT DOCUMENTS

| | | | | |
|---|---|---|---|---|
| EP | 1517158 B1 * | 4/2010 | ........... | G01S 17/895 |
| WO | WO-2014122624 A1 * | 8/2014 | ........... | G01S 13/90 |

* cited by examiner

METHOD AND SYSTEM FOR DETECTION AND SYNTHETIC APERTURE IMAGING OF A TARGET

RELATED PATENT APPLICATION

The present application claims priority to U.S. Provisional Patent Application No. 62/889,080 filed on Aug. 20, 2019, the disclosure of which is incorporated herein by reference in its entirety.

TECHNICAL FIELD

The technical field generally relates to synthetic aperture (SA) imaging, and more particularly, to a method and system for detection and SA imaging of a target.

BACKGROUND

Synthetic aperture (SA) imaging can be used to increase resolution beyond the diffraction limit of a physical aperture of an imaging system. In SA imaging, a large virtual aperture is synthesized by illuminating a target region with electromagnetic signals transmitted from a moving platform, and by collecting phase-coherent return echoes produced by reflection of the electromagnetic signals from the target region. The return echoes are recorded and combined to reconstruct an image of the target region. SA imaging was initially developed and has been employed at radio and microwave frequencies, so that the systems in which SA imaging was first implemented were referred to as "synthetic aperture radar" (SAR) systems. Conventional SAR systems typically operate in the centimeter wavelength range and produce images with azimuth resolutions of the order of a decimeter to a meter. As resolution generally varies inversely to the imaging wavelength, there has been an interest to extend SAR to shorter wavelengths.

A technology referred to as "synthetic aperture lidar" (SAL) has been developed to extend SAR to the visible and near-infrared regions of the electromagnetic spectrum, with most reported experimental studies of SAL having been conducted in the last decade or so. It is envisioned that SAL could produce images with azimuth resolutions of centimeters or less, while providing information complementary to that provided by SAR. Typical implementations of SAL are based on coherent detection with chirped signals. In coherent detection, the return signal reflected from the target is mixed with a local oscillator (LO) reference signal. The mixing of the return signal with the LO signal results in the generation of a beat signal having a frequency, the beat frequency, representative of the difference between the frequencies of the two mixed signals. The phase, frequency, and other spectral characteristics of the return signal can be extracted from the beat signal to provide information about the target. The beat frequency depends on the difference between the optical path length of the LO signal and the optical path length of the transmission/return signals from the source to the target and back to the detector.

One challenge in SAL is to adjust the optical path length of the LO signal to match the round-trip optical path length of the transmission/return signals to ensure that the spectrum of the beat signal falls within the bandwidth of the detector. One existing approach devised to tackle with this challenge is to use an optical delay line, for example, an optical fiber, to retard the LO signal by an amount that approximately matches the round-trip time to the target. Such an approach relies on some prior knowledge of the expected target range, which may not be possible or practical in some applications. Examples of such applications include spaceborne SAL systems used for detection, tracking, and/or imaging of space objects, such as satellites and space debris, moving through empty or relatively uniform background scenes. Furthermore, the locations of space objects are generally a priori unknown, or not known precisely enough, not only in range, but also in angle. As SAL systems generally have a relatively narrow field of view, notably due to the limited detection bandwidth, this may present another challenge to their use in space object detection and imaging applications.

SUMMARY

The present description generally relates to methods and systems for detection and SA imaging of a target.

In accordance with an aspect, there is provided a method for detection and synthetic aperture (SA) imaging of a target, the method including:
 illuminating a scene along a search direction with a search signal transmitted from a platform in relative movement with respect to the scene along a travel path;
 receiving, on the platform, a search return signal produced by reflection of the search signal from a target present in the scene;
 estimating, from the search return signal, a range and an angular location of the target; generating an SA transmission signal and a local oscillator (LO) signal with a time delay therebetween, the time delay being based on the estimated range of the target;
 illuminating the scene along an imaging direction with the SA transmission signal transmitted from the platform, the imaging direction being based on the estimated angular location of the target; receiving, on the platform, an SA return signal produced by reflection of the SA transmission signal from the target;
 mixing the SA return signal with the LO signal to generate SA signal data; and generating an SA image of the target from the SA signal data.

In one embodiment, estimating the angular location of the target includes estimating the angular location of the target with respect to a direction substantially parallel to the travel path In one embodiment, the method further includes:
 scanning the search signal over a plurality of additional search directions oriented with respect to the search direction, wherein, at the estimated range of the target, an angular field of illumination of the search signal associated with each additional search direction overlaps at least partly with an angular field of illumination of the search signal associated with the search direction;
 receiving a corresponding plurality of additional search return signals produced by reflection of the search signal from the target;
 refining, from the plurality of additional search return signals, the estimated angular location of the target; and adjusting the imaging direction of the SA transmission signal based on the refined estimated angular location of the target.

In one embodiment, refining the estimated angular location of the target includes refining the estimated angular location of the target with respect to a direction substantially perpendicular to the travel path.

In one embodiment, illuminating the scene with the search signal includes controlling a beam divergence of the search signal, and illuminating the scene with the SA transmission signal includes controlling a beam divergence of the SA transmission signal to be less than the beam divergence of the search signal.

In one embodiment, the search signal, the SA transmission signal, and the LO signal are generated as chirped laser pulses having a center frequency in a range from 30 terahertz to 300 terahertz. In one embodiment, the search signal, the SA transmission signal, and the LO signal are generated using a same light source.

In one embodiment, the platform is a spacecraft and the target is a space object.

In accordance with another aspect, there is provided a system for detection and synthetic aperture (SA) imaging of a target from a platform in relative movement with respect to a scene along a travel path, the system including:
- a light source assembly for mounting on the platform and configured to generate a search signal, an SA transmission signal, and a local oscillator (LO) signal;
- a transmitter-receiver assembly for mounting on the platform and configured to illuminate the scene with the search signal along a search direction; receive a search return signal produced by reflection of the search signal from a target present in the scene; illuminate the scene with the SA transmission signal; and receive an SA return signal produced by reflection of the SA transmission signal from the target;
- a detector assembly for mounting on the platform and configured to detect the search return signal and detect the SA return signal by mixing the SA return signal with the LO signal to generate SA signal data; and
- a control and processing unit operatively coupled to the light source assembly, the transmitter-receiver assembly, and the detector assembly, the control and processing unit being configured to:
  - estimate, from the search return signal, a range and an angular location of the target; control the light source assembly to generate the SA transmission signal and the LO signal with a time delay therebetween, the time delay being based on the estimated range of the target;
  - control the transmitter-receiver assembly to illuminate the scene with the SA transmission signal along an imaging direction, the imaging direction being based on the estimated angular location of the target;
  - receive the SA signal data from the detector assembly; and
  - generate an SA image of the target from the SA signal data.

In one embodiment, the control and processing unit is configured to estimate the angular location of the target with respect to a direction substantially parallel to the travel path.

In one embodiment, the transmitter-receiver assembly is configured to scan the search signal over a plurality of additional search directions and receive a corresponding plurality of additional search return signals produced by reflection of the search signal from the target, wherein, at the estimated range of the target, an angular field of illumination of the search signal associated with each additional search direction overlaps at least partly with an angular field of illumination of the search signal associated with the search direction. Further, the control and processing unit is configured to refine, from the plurality of additional search return signals, the estimated angular location of the target and control the transmitter-receiver assembly to adjust the imaging direction of the SA transmission signal based on the refined estimated angular location of the target. In one embodiment, the control and processing unit is configured to refine the estimated angular location of the target with respect to a direction substantially perpendicular to the travel path.

In one embodiment, the transmitter-receiver assembly is configured to control a beam divergence of the SA transmission signal to be less than a beam divergence of the search signal.

In one embodiment, the light source assembly includes at least one laser source configured to generate the search signal, the SA transmission signal, and the LO signal as chirped laser pulses having a center frequency in a range from 30 terahertz to 300 terahertz.

In one embodiment, the system further includes multi-mode optical fibers configured to transmit the search signal from the light source assembly to the transmitter-receiver assembly and transmit the search return signal from the transmitter-receiver assembly to the detector assembly. The system also includes single-mode optical fibers configured to transmit the SA transmission signal from the light source assembly to the transmitter-receiver assembly and transmit the SA return signal from the transmitter-receiver assembly to the detector assembly.

In one embodiment, the transmitter-receiver assembly includes a telescope configured to receive the search signal and the SA transmission signal from the light source assembly and including a primary mirror and a secondary mirror having a relative orientation to each other, and the control and processing unit is operatively coupled to the telescope and configured to adjust the search direction of the search signal and the imaging direction of the SA transmission signal by controlling the relative orientation between the primary mirror and the secondary mirror.

In one embodiment, the detector assembly includes a photon counting detector configured to detect the search return signal and an optical heterodyne detector configured to detect the SA return signal.

In accordance with another aspect, there is provided a non-transitory computer readable storage medium having stored thereon computer executable instructions for use with a system for detection and synthetic aperture (SA) imaging of a target, the system being mounted on a platform in relative movement with respect to a scene and including a light source assembly, a transmitter-receiver assembly, and a detector assembly, wherein the computer executable instructions, when executed by a processor, cause the processor to perform steps of:
- controlling the light source assembly to generate a search signal to illuminate the scene along a search direction to produce a search return signal by reflection of the search signal from a target present in the scene;
- estimating, from the search return signal, a range and an angular location of the target;
- controlling the light source assembly to generate an SA transmission signal and a local oscillator (LO) signal with a time delay therebetween, the time delay being based on the estimated range of the target;
- controlling the transmitter-receiver assembly to illuminate the scene with the SA transmission signal along an imaging direction to produce an SA return signal by reflection of the SA transmission signal from the target, the imaging direction being based on the estimated angular location of the target;
- receiving SA signal data from the detector assembly resulting from a mixing of the SA return signal received by the transmitter-receiver assembly with the LO signal; and generating an SA image of the target from the SA signal data.

In one embodiment, the computer executable instructions, when executed by the processor, further cause the processor to perform steps of:

controlling the transmitter-receiver assembly to scan the search signal over a plurality of additional search directions to produce a corresponding plurality of additional search return signals by reflection of the search signal from the target, wherein, at the estimated range of the target, an angular field of illumination of the search signal associated with each additional search direction overlaps at least partly with an angular field of illumination of the search signal associated with the search direction;

refining, from the plurality of additional search return signals, the estimated angular location of the target; and controlling the transmitter-receiver assembly to adjust the imaging direction of the SA transmission signal based on the refined estimated angular location of the target.

In accordance with another aspect, there is provided a computer device for use with or in a system for detection and synthetic aperture (SA) imaging of a target, the computer device including a processor and a non-transitory computer readable storage medium of claim such as disclosed herein, the non-transitory computer readable storage medium being operatively coupled to the processor.

It is to be noted that other method and process steps may be performed prior to, during or after the steps described herein. The order in which one or more steps are carried out may also differ, and some of the steps may be omitted, repeated and/or combined, depending on the application. It is also to be noted that some method steps can be performed using various image processing techniques, which can be implemented in hardware, software, firmware or any combination thereof.

Other objects, features and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

BRIEF DESCRIPTION OF THE DRAWINGS

FIGS. 2A to 2C depict various parameters and features of, or related to, the imaging system, each at different moments of its operation.

DETAILED DESCRIPTION

Figure 1:
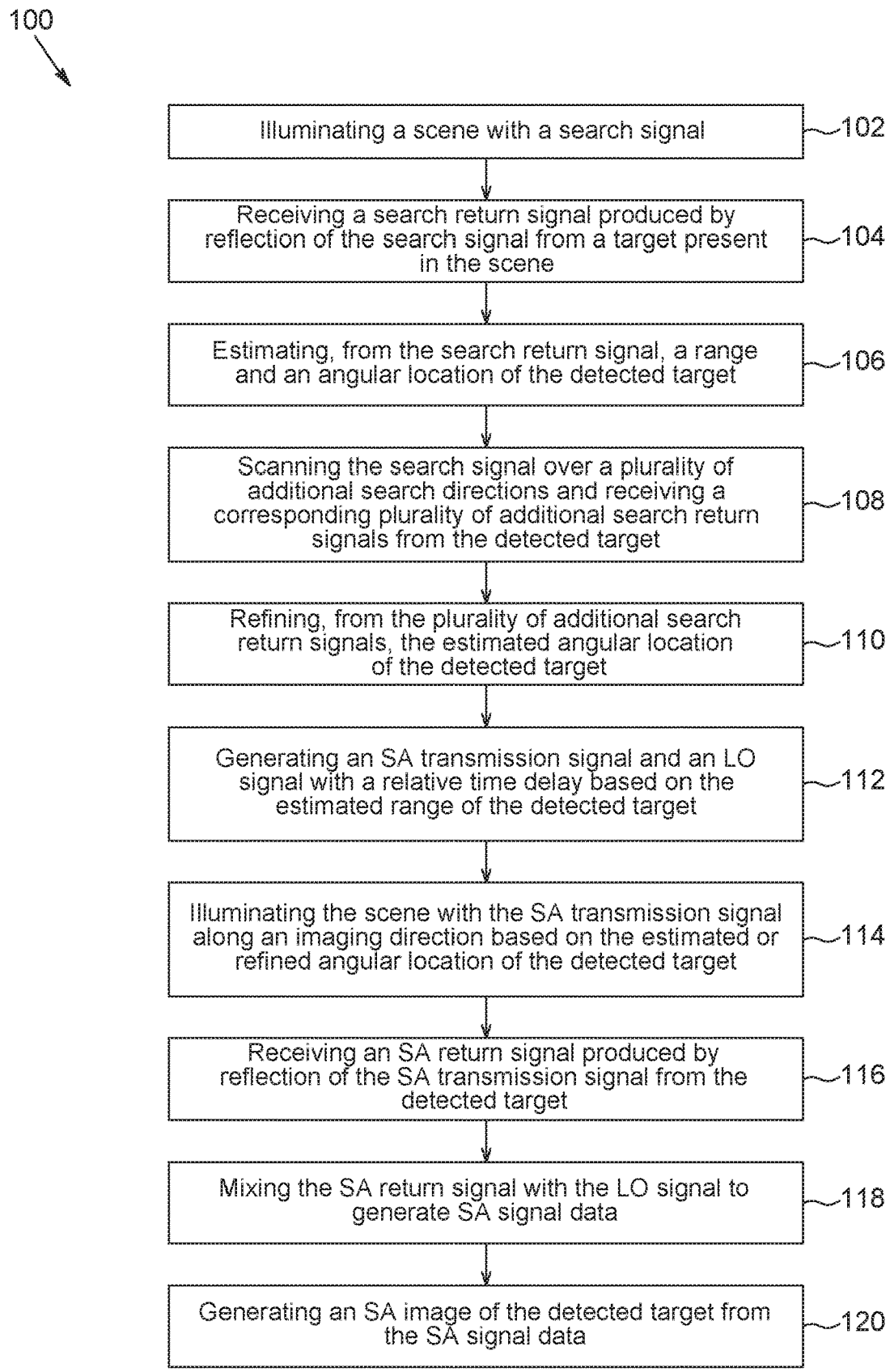
FIG. 1 is a flow diagram of a method for detection and SA imaging of a target, in accordance with an embodiment.

In the present description, similar features in the drawings have been given similar reference numerals. To avoid cluttering certain figures, some elements may not be indicated if they were already identified in a preceding figure. It is appreciated that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It is appreciated that such spatially relative terms are intended to encompass different orientations in the use or operation of the present embodiments, in addition to the orientations exemplified in the figures.

The terms "a", "an" and "one" are defined herein to mean "at least one", that is, these terms do not exclude a plural number of items, unless stated otherwise.

Terms such as "substantially", "generally", "about", that modify a value, condition or characteristic of a feature of an exemplary embodiment, should be understood to mean that the value, condition or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10% of the stated value. It is noted that all numeric values used herein are assumed to be modified by the term "about", unless stated otherwise.

The terms "match", "matching" and "matched" are intended to refer herein to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

The terms "connected", "coupled", and derivatives and variants thereof, refer herein to any connection or coupling, either direct or indirect, between two or more elements. The connection or coupling between the elements may be, for example, mechanical, optical, electrical, thermal, magnetic, chemical, fluidic, logical, operational, or any combination thereof.

The present description generally relates to techniques for detection and synthetic aperture (SA) imaging of a target. Examples of methods, systems, non-transitory computer readable storage media, and computer devices implementing the present techniques are described.

In some implementations, the disclosed technique may employ a wide-angle lidar-based remote sensing technique to detect the presence of a target and estimate information about its location in range and in angle. The disclosed technique may use the target location information thus determined to perform narrow-angle SA imaging of the target. The SA imaging process may involve using the estimated target range to adjust a time delay between an SA transmission signal used for illuminating the target and a local oscillator (LO) signal used for mixing with an SA return signal from the target. The SA imaging process may also involve using the estimated target angular location to adjust a pointing direction of the SA transmission signal.

The present techniques may be used in SA lidar (SAL) systems operating at wavelengths in the visible or near-infrared regions of the electromagnetic spectrum. However, the present techniques may also be employed in other types of SA imaging modalities, including, but not limited to, SA radar (SAR) imaging, SA terahertz imaging, and SA infrared imaging. As such, the terms "light" and "optical", and variants and derivatives thereof, are intended to refer herein to radiation in any appropriate region of the electromagnetic spectrum. These terms are not limited to visible light but may also include invisible regions of the electromagnetic spectrum including, without limitation, the radio, microwave, terahertz, infrared, and ultraviolet wavelength ranges. For example, in SAL applications, the terms "light" and "optical" can encompass electromagnetic radiation having a wavelength ranging from a few hundreds of nanometers to a few micrometers. However, this range is provided for illustrative purposes only and the present techniques may operate outside this range.

The present techniques can be used or implemented in various SA imaging applications that may require or benefit from improved target detection and localization capabilities. The present techniques may be implemented in a variety of SA imaging systems mounted in airborne, spaceborne, and terrestrial systems, for both civilian and military applications. It is appreciated that the term "SA imaging" is intended to encompass both conventional SA imaging and inverse SA imaging.

Referring to FIG. 1, there is provided a flow diagram of an embodiment of a method 100 for detection and SA imaging of a target present in a scene viewed from a platform in relative movement with respect to the scene.

In the present description, the term "scene" is intended as a broad term encompassing any region, space, volume, area, surface, environment, or structure of interest that can be monitored for detection, localization, and SA imaging of a target according to the present techniques. The scene may be a ground scene, for example, a ground surface of the Earth as viewed from above, such as a landscape or a seascape; a sky scene; or an outer-space scene extending beyond the Earth's atmosphere.

The term "target" is intended as a broad term encompassing any object, person, animal, or feature of interest present in a scene, whether natural or human-made, which may be detected, localized, and imaged according to the present techniques.

The term "platform" is used broadly to encompass any suitable type of land, waterborne, airborne, or spaceborne vehicles, devices, or equipment, whether manned or unmanned, on which a target detection and imaging system as disclosed herein may be mounted to implement the present techniques. It is appreciated that the expression "platform in relative movement with respect to a scene" is intended to encompass scenarios where the platform moves, in translation and/or in rotation, with respect to a stationary scene, scenarios where the scene moves with respect to a stationary platform, and scenarios where both the platform and the scene move.

The method 100 generally involves two main phases. In a first phase, an optical remote sensing technique, for example, relying on a lidar-based approach, is used to detect the presence of a target in the scene and estimate information about its location in range and in angle. In a second phase, the target location information estimated in the first phase is used to perform SA imaging of the detected target. The SA imaging phase can involve using the estimated target range to adjust a time delay between the SA transmission signal used for illuminating the target and the LO signal used for mixing with the SA return signal from the target. The SA imaging phase can also involve using the estimated target angular location to adjust the pointing direction of the SA transmission signal. It is appreciated that the SA imaging phase may be performed immediately or without delay after the target detection phase, or at a later moment. For example, in space-object-monitoring applications, the target detection phase may be performed during a certain orbit pass of a space object close to the platform's orbit, and the SA imaging phase may be performed during the same orbit pass or a subsequent orbit pass of the detected space object. These and other possible steps of the method 100 are described in greater detail below.

Figure 2A:
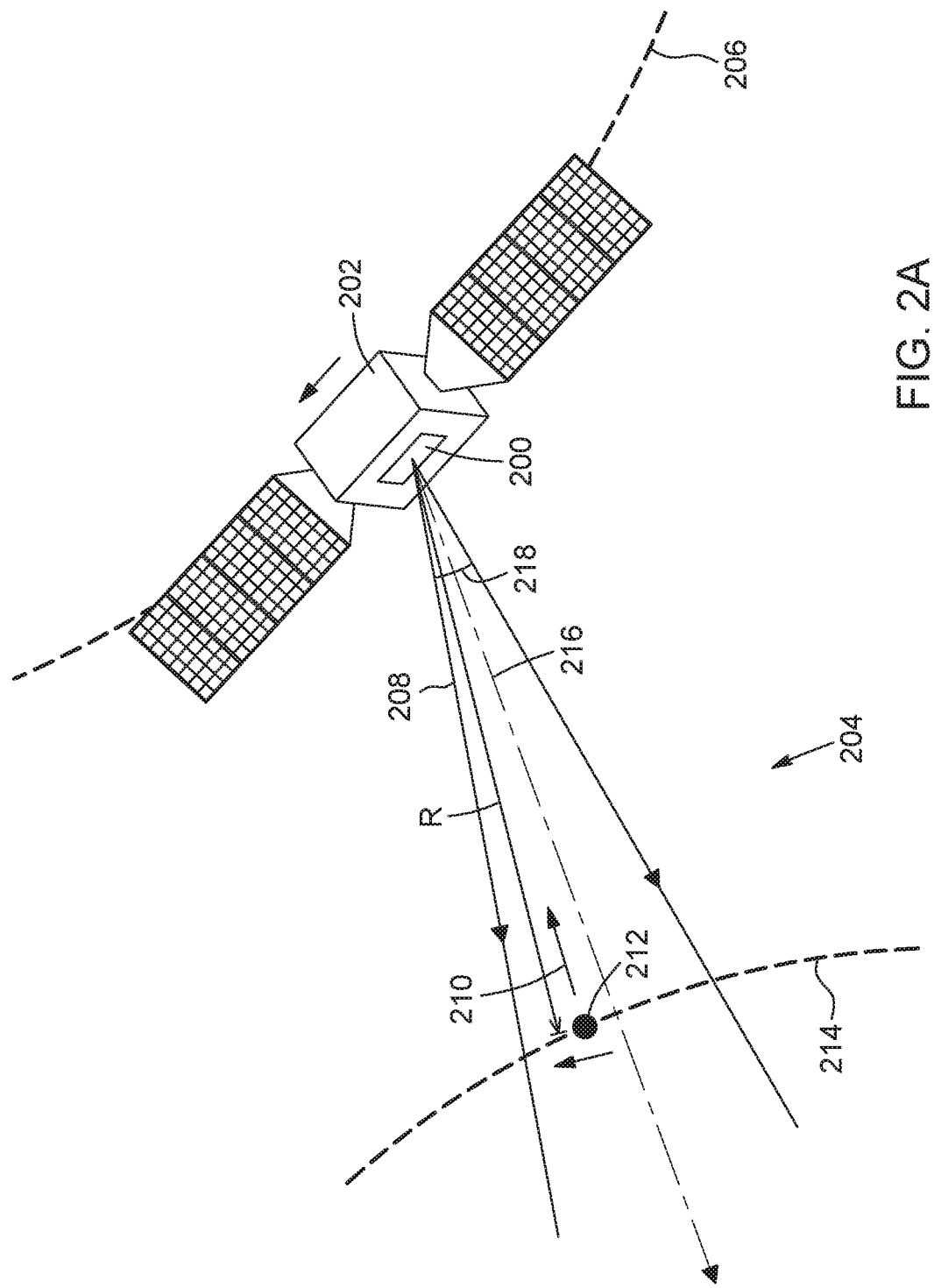
FIGS. 2A to 2C are schematic representations of a platform in relative movement with respect to a scene and on which is mounted a system for detection and SA imaging of a target, in accordance with another embodiment.
Figure 2B:
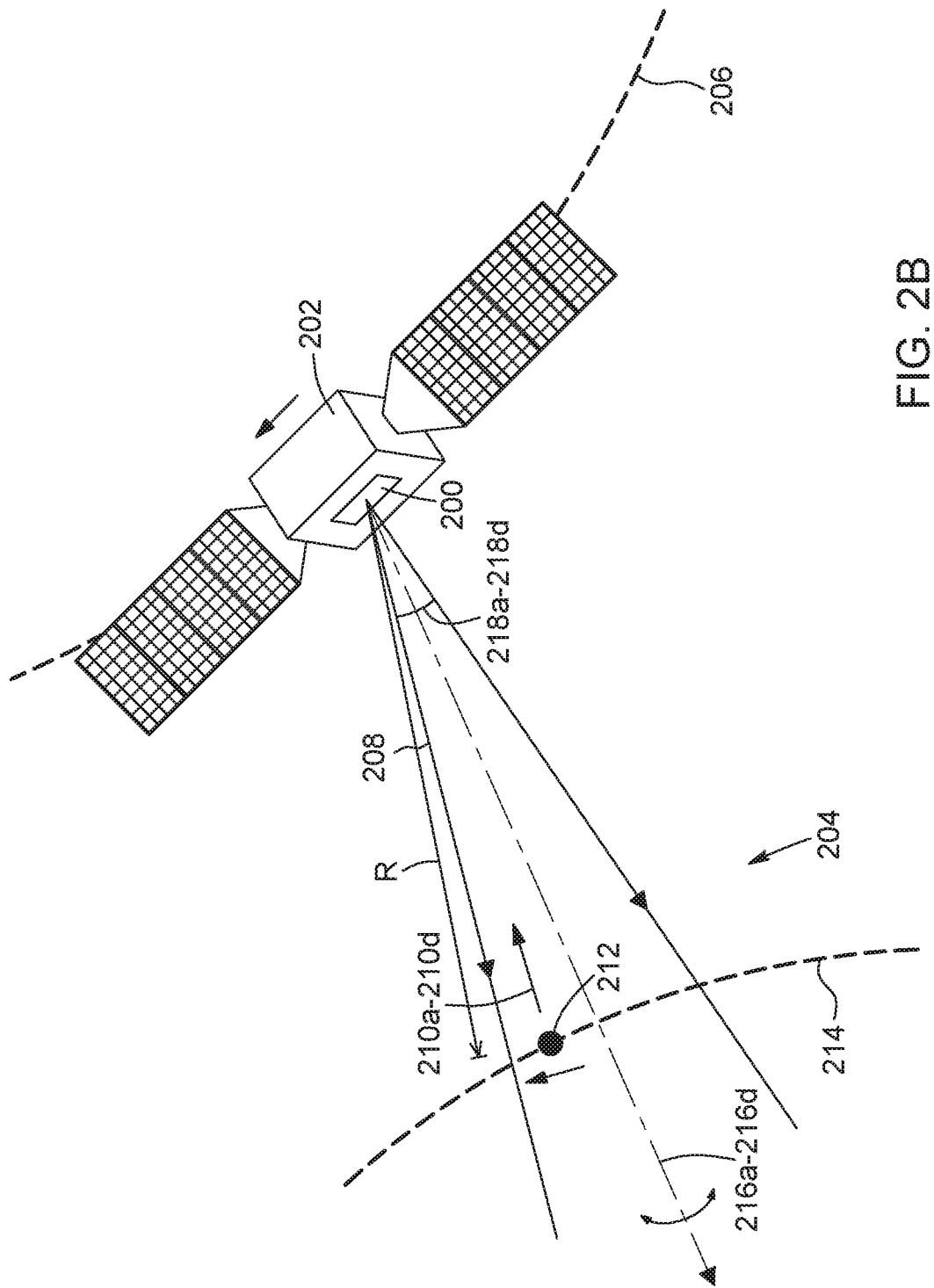
Figure 2C:
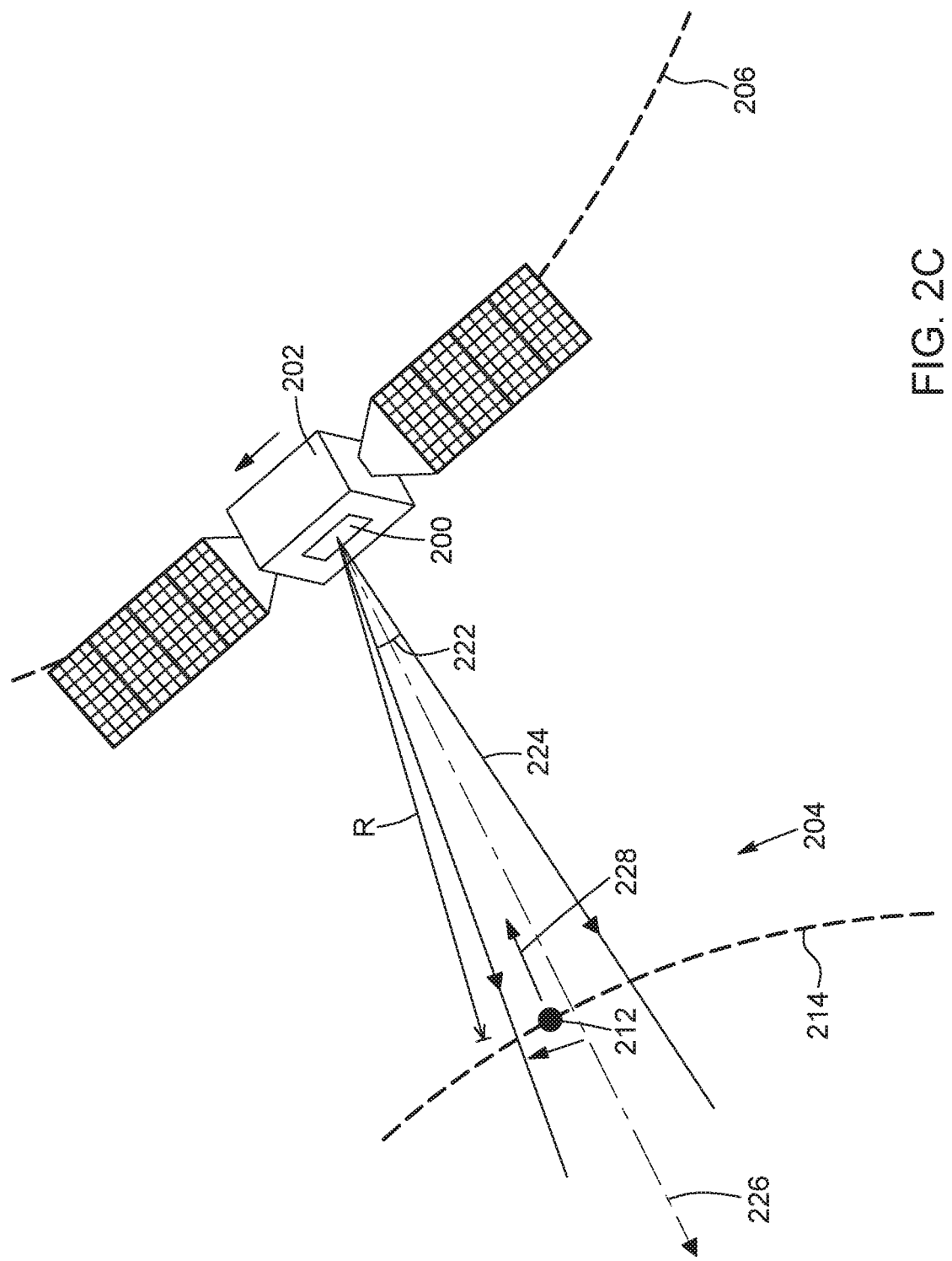

The method 100 of FIG. 1 may be implemented in an imaging system 200 mounted on a platform 202 that moves with respect to a scene 204 along a travel path 206, such as depicted in FIGS. 2A to 2C, which schematically illustrate the system 200 at three different moments of operation corresponding to different steps of the method 100 of FIG. 1. In this embodiment, the platform 202 is a spacecraft and the travel path 206 is an orbital trajectory followed by the spacecraft. Depending on the application, the spacecraft can orbit the Earth, for example, along a low-Earth orbit, or another celestial body, such as the Sun, another planet, or a moon.

In the present description, the term "spacecraft" is used broadly to encompass a variety of manned and unmanned space vehicles, devices, and equipment orbiting or flying in space including, but not limited to, satellites, space probes, spaceplanes, space capsules, and space stations. In the embodiment of FIGS. 2A to 2C, the platform 202 is a space-object-monitoring satellite used for detecting and imaging space objects moving in nearby orbits, for example, to help preventing collisions in space, track and identify space objects, and/or discriminate between threatening and non-threatening space objects. Non-limiting examples of space objects include other satellites, both domestic and foreign, including spy satellites; anti-satellite missiles and other space weapons designed to destroy or damage satellites for military purposes; and space debris. The term "space debris" is intended herein as a broad term encompassing both natural debris, such as asteroids, comets, and meteoroids, as well as artificial or human-made debris, such as inactive satellites, abandoned or discarded parts from spacecraft and launching equipment, fragmentation debris, and any other space object in orbit around the Earth that no longer serves a useful purpose.

Referring to FIGS. 1 and 2A, the method 100 includes a step 102 of illuminating the scene 204 with a search signal 208 transmitted from the platform 202, and a step 104 of receiving, on the platform 202, a search return signal 210 produced by reflection of the search signal 208 from a target 212 present in the scene 204. The target 212 may be a space object, for example, a space debris, traveling along an orbit 214 in outer space. Upon target detection in the search return signal 210, the method 100 also includes a step 106 of estimating, from the search return signal 210, a range and an angular location of the target 212 with respect to the platform 202.

In the present techniques, the search signal 208 is used as a target searching probe. The search signal 208 can be made of any suitable type of electromagnetic waves that can be used for target detection and ranging. For example, in some embodiments, the search signal 208 can be a pulsed laser beam with a wavelength or waveband in the near-infrared or short-wave infrared. The search signal 208 can be characterized by a search direction 216 and by an angular field of illumination 218. The angular field of illumination 218, which is related to the beam divergence, or angular spreading, of the search signal 208, determines the size of the search signal footprint at a given range. In FIG. 2A, the search direction 216 of the search signal 208 is oriented in a forward direction, at a non-zero angle with respect to the travel direction of the platform 202 along the travel path 206, to detect a target located ahead of the platform 202. However, it is appreciated that in other embodiments, the search signal 208 may be configured to point in any suitable direction with respect to the travel direction of the platform 202. Depending on the application, the search direction 216 may or may not vary during the target searching phase of the method 100.

The target detection and localization steps of the method 100 of FIG. 1 may be performed using a lidar-based remote sensing technique or another suitable optical detection and ranging technique. These techniques may employ various range measurement methods, including time-of-flight (TOF), phase-shift, and frequency modulation methods. By way of example, in TOF-based lidar implementations, the round-trip time required for the search signal 208 to travel from a transmitter on the platform 202 to a target 212 in the scene 204 and return as the search return signal 210 to a receiver on the platform 202 is measured. The range to the target 212, which corresponds to the distance between the target 212 and the platform 202, is obtained by multiplying the speed of light by half the round-trip time thus measured. The general principles underlying target detection and range estimation using optical detection and ranging techniques, including TOF-based lidars, are generally known in the art and need not be described in greater detail herein.

Referring still to FIGS. 1 and 2A, various threshold-based detection techniques and criteria may be applied to determine whether certain peaks or features present in the search return signal 210 reliably represent return echoes produced by reflection of the search signal 208 from a target 212 present in the scene 204. For example, in one embodiment, the search return signal 210 generated in response to the search signal 208 can be recorded as a set of N return signal samples representing the search return signal 210 at a corresponding set of N sequential sampling times elapsed after the emission time of the search signal 208. The detected energy E(t) for each sampling time may be written as follows:

$$E(t) = T_T T_R P_0 \left( \frac{A_{target}}{\pi r_{beam}^2(R)} \right) \left( \frac{\rho_{target}}{\pi} \right) \left( \frac{\pi r_L^2}{R^2} \right) \xi(R) \eta_Q \min(\tau_{int}, \tau_{pulse}). \quad (1)$$

In Equation (1), $T_T$ and $T_R$ are the overall transmission coefficients of the optics of the optical transmitter and receiver, respectively; Po is the peak power of the search signal 208; $A_{target}$ is the target cross-sectional area; $r_{beam}(R)$ is the beam footprint radius at range R (i.e., the radius of the angular field of illumination 218 of the search signal 208 at range R); $\rho^{target}$ is the target reflectance at the search signal wavelength; $r_L$ is the receiving aperture radius; $\xi(R)$ is the geometrical overlap of the receiver at range R corresponding to sample time t; $\eta_Q$ is the detector quantum efficiency; Tint is the detector integration time; and $\tau_{pulse}$ is the pulse duration of the search signal 208.

Considering that the energy $E_\gamma$ of a photon in the search return signal 210 is given by $E_\gamma = hc/\lambda$, where h is the Planck constant, c is the speed of light in vacuum, and λ is the photon's wavelength, the average number of photons, $N_\gamma(t)$ recorded at each time-bin is given by:

$$N_\gamma(t) = \frac{E(t)}{E_\gamma} = T_T T_R P_0 \left( \frac{A_{target}}{\pi r_{beam}^2} \right) \left( \frac{\rho_{target}}{\pi} \right) \left( \frac{\pi r_L^2}{R^2} \right) \left( \frac{\lambda}{hc} \right) \xi(R) \eta_Q \min(\tau_{int}, \tau_{pulse}), \quad (2)$$

where $N_\gamma(t)$ is typically less than one. The sampling period Δt of the search return signal 210 is related to the spatial resolution in range of the detection, Δr, according to:

$$\Delta t = \frac{2 \Delta r}{c}. \quad (3)$$

The sampling period is generally shorter than the pulse duration of the search signal 208 to avoid missing a target return echo that would otherwise be received between two successive samples. The sampling of the search return signal may start at an initial sampling time $t_i = 2R_{min}/c$ and end at a final sampling time $t_f = 2R_{max}/c$, where $\Delta R = R_{max} - R_{min}$, is the probed range interval between a minimum range $R_{min}$ and a maximum range $R_{max}$. For example, in space-object monitoring applications, the probe range interval may range from about 100 to about 1000 kilometers, although other probed range intervals may be used in other implementations.

In some embodiments, the pulse repetition frequency (PRF) of the search signal 208 may fulfill the following condition to avoid confusion between returns of successive emission pulses:

$$PRF < \frac{c}{2R_{max}} = \frac{1}{t_f}. \quad (4)$$

Furthermore, while the system 200 may not be blind to contributions to the search return signal 210 from regions of the scene 204 that extend beyond $R_{max}$, the intensity of such contributions decreases as the square of the distance from the platform 202. In some implementations, potential target range ambiguities may be resolved or reduced by making measurements at several PRFs.

In implementations where a photon-counting detector (e.g., a single-photon counting detector) is used to detect the search return signal 210, a target detection may be assumed to occur whenever at least one photon is recorded in the range-bin at range R. In such a case, assuming that $N_\gamma(t)<1$ in Equation (2), one finds that $M=1/N_\gamma(t)$ lidar traces should be summed to record one photon and conclude that a target detection has occurred, where each lidar trace may represent the search return signal 210 measured between $t_i$ and $t_f$ (or equivalently between $R_{min}$ and $R_{max}$) in response to one emission pulse of the search signal 208. From Equations (2) and (4), the time duration $t_{detection}$ needed to record at least one photon in the range-bin at range R and determine that a target detection has occurred may be written as follows:

$$t_{detection} = \frac{M}{PRF_{max}} \quad (5)$$

$$= \frac{2\pi h r_{beam}^2(R) R^2 R_{max}}{T_T T_R P_0 A_{target} \rho_{target} r_L^2 \lambda \xi(R) \eta_Q \min(\tau_{int}, \tau_{pulse})}$$

$$\approx \frac{2\pi h r_{beam}^2(R) R^3}{T_T T_R P_0 A_{target} \rho_{target} r_L^2 \lambda \xi(R) \eta_Q \min(\tau_{int}, \tau_{pulse})},$$

where it was assumed in Equation (5) that $PRF_{max}=c/(2R_{max})$ and $R^2 R_{max} \approx R^3$.

If the speed of the platform 202 relative to the target 212 is v, the displacement D of the platform 202 relative to the target 212 during $t_{detection}$ will be $D=vt_{detection}$. In order for the target 212 detected at range R to remain within the angular field of illumination 218 of the search signal 208 over the entire acquisition time, $t_{detection}$, the following condition should be fulfilled at range R:

$$2r_{beam}(R) > D. \quad (6)$$

From Equation (6), a scan effectiveness factor $S_{eff}$ may be defined as follows:

$$S_{eff} = \frac{D}{2r_{beam}(R)}. \quad (7)$$

It is appreciated that $S_{eff}$ should be generally small, in particular smaller than one, for efficient target detection.

Figure 3:
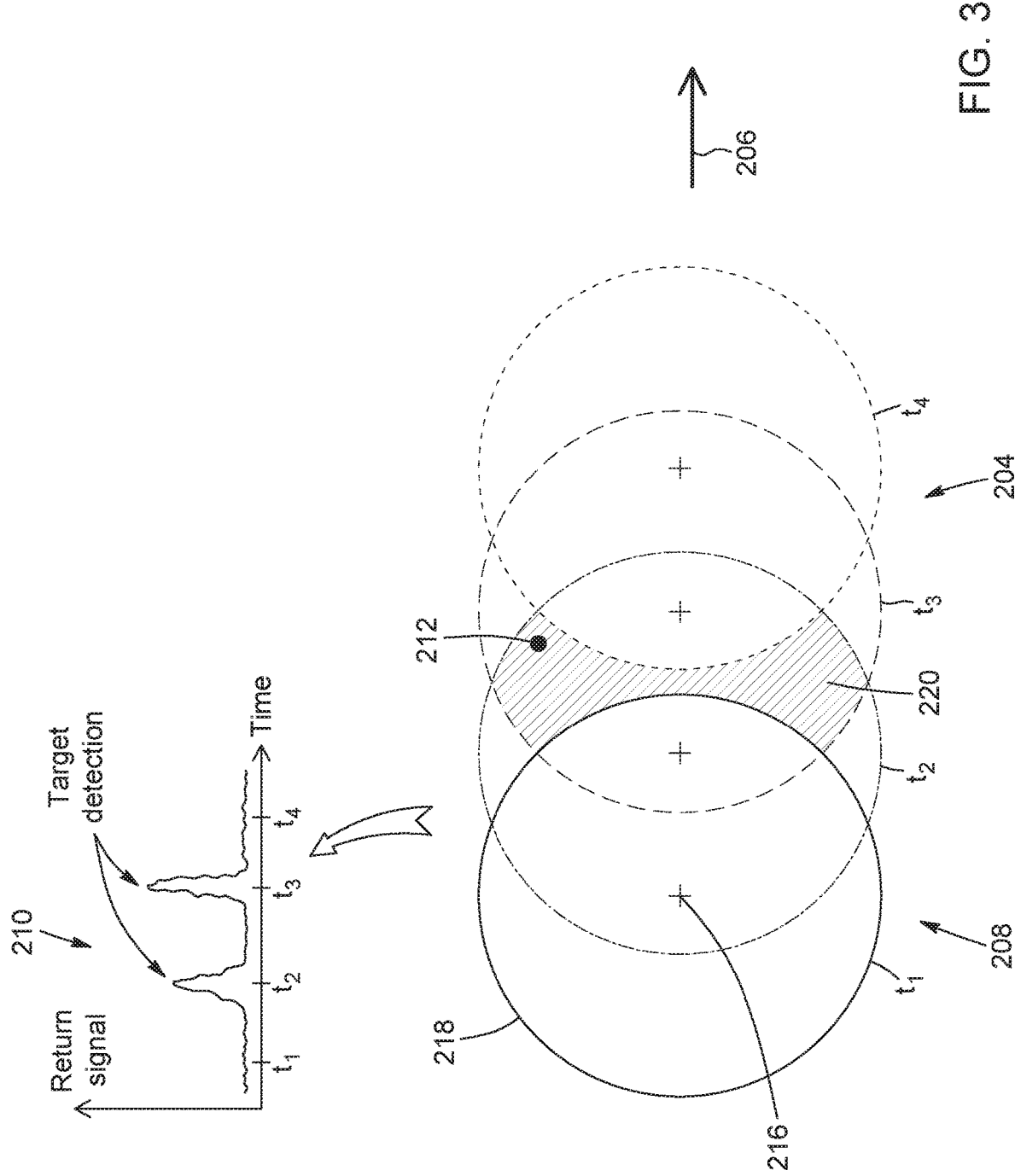
FIG. 3 is a schematic representation of a procedure for estimation of the target angular location using a search signal emitted from a platform in relative movement with respect to a scene containing the target, in accordance with another embodiment.

In addition to a range of the target 212, the estimating step 106 of the method 100 involves estimating an angular location 220 of the target 212 within the scene 204. FIG. 3 is a schematic representation of a procedure for estimating the angular location 220 of a detected target 212 using the search signal 208 emitted from the platform 202 as it moves relative to the scene 204 along its travel path 206. The search signal 208 has a search direction 216 and a search angular field of illumination 218, the latter determining the size of the search signal footprint at the estimated target range. In FIG. 3, the search signal 208 is depicted in the reference frame of the target at four different times $t_1$, $t_2$, $t_3$, and $t_4$ of the target detection process, in a constant-range surface located at the estimated target range. The search return signal 210 produced by reflection of the search signal 208 from the target 212 may include one or more of target returns recorded as a function of time. For example, in FIG. 3, the search return signal 210 includes target returns at $t_2$ and $t_3$, but not at $t_1$ and $t_4$.

Because the platform 202 moves relative to the scene 204, and thus, generally, with respect to the target 212, the location of the target 212 within the angular field of illumination 218 of the search signal 208 will vary as a function of time. This is depicted in FIG. 3, where the target 212 is closer to the edge of the search angular field of illumination 218 for the target return recorded at time $t_2$ than it is for the target return recorded at time $t_3$. It is appreciated that at any given sampling time where a target return is detected, the target 212 could be possibly anywhere within the angular field of illumination 218 of the search signal 208 at the given sample. However, when the target 212 is detected at a plurality of sampling times (e.g., $t_2$ and $t_3$ in FIG. 3), its angular location 220 can be estimated to be within a smaller region, corresponding to the region at the estimated range R that is both overlapped by the search angular field of illumination 218 at the sampling times where the target is detected (e.g., $t_2$ and $t_3$ in FIG. 3) and not overlapped by the search angular field of illumination 218 at the sampling times where the target is not detected (e.g., $t_1$ and $t_4$ in FIG. 3). The estimated target angular location 220 corresponds to the hatched region in FIG. 3.

It is appreciated that the step 106 of estimating the target angular location 220 may be useful for estimating the angular location of the target 212 with respect to a direction that is substantially parallel to the travel path (e.g., the horizontal direction in FIG. 3), defining the along-track angular location of the target 212. This is because it is the direction along which the search signal 208 is naturally swept as the platform 202 moves relative to the scene 204, even if the search direction 216 of the search signal 208 remains constant in the reference frame of the platform. However, the step 106 of estimating the target angular location depicted in FIG. 3 may also provide information about the angular location of the target 212 with respect to a direction that is substantially perpendicular to the travel path 206 (e.g., the vertical direction in FIG. 3), defining the across-track angular location of the target 212. Indeed, it is appreciated that not only the horizontal extent, but also the vertical extent of the hatched region defining the estimated target angular location 220 in FIG. 3 would be smaller if the target 212 was detected in the search return signal at either sampling time $t_1$ or sampling time $t_4$.

In some embodiments, the estimate of the target angular location determined at step 106 may be sufficient for use in SA imaging, along with the target range estimate. For instance, this may be the case when the field of illumination 218 used for target detection (e.g., the lidar beam divergence angle) is no wider than the field of illumination 222 used for SA imaging (e.g., the SAL beam divergence angle).

However, in other embodiments, the search signal 208 used for target detection and localization has a relatively wide field of illumination 218, for example, with a beam divergence which may be on the order of hundreds of microradians up to a few milliradians. It is appreciated that while increasing the divergence of the search signal 208 may decrease the intensity of the light reflected from a target 212, it may also provide a wider angular coverage of the scene 204, which may lead to improved target detection capabilities. Using a search signal 208 with a large angular coverage for enhanced target detection may be desirable or required in some embodiments. This may be the case in space-object-monitoring applications, where targets are often few, far away, and found anywhere within the scene. The relatively low accuracy in the target angular location estimate provided by using a wide-angle search signal 208 can be a challenge if the target angular location estimate is then used to determine the pointing or imaging direction of a low-divergence SA transmission signal, for example, with a beam divergence which may be on the order of about 10 microradians, used for narrow-angle SA imaging of the detected target 212.

Referring now to FIGS. 1 and 2B, in some implementations the method 100 can allow for improving the target angular location estimated at step 106 using a search signal 208 with a constant search direction 216 in the reference frame of the platform 202 and a large angular field of illumination 218. To this end, the method 100 may include a step 108 of scanning the search signal 208 over a plurality of additional search directions 216a-216d oriented with respect to the search direction 216 used at step 106 and receiving a corresponding plurality of additional search return signals 210a-210d produced by reflection of the search signal 208 from the target 212. The method 100 may also include a step 110 refining, from the plurality of additional search return signals 210a-210d, the angular location 220 of the target estimated at step 106.

Figure 4:
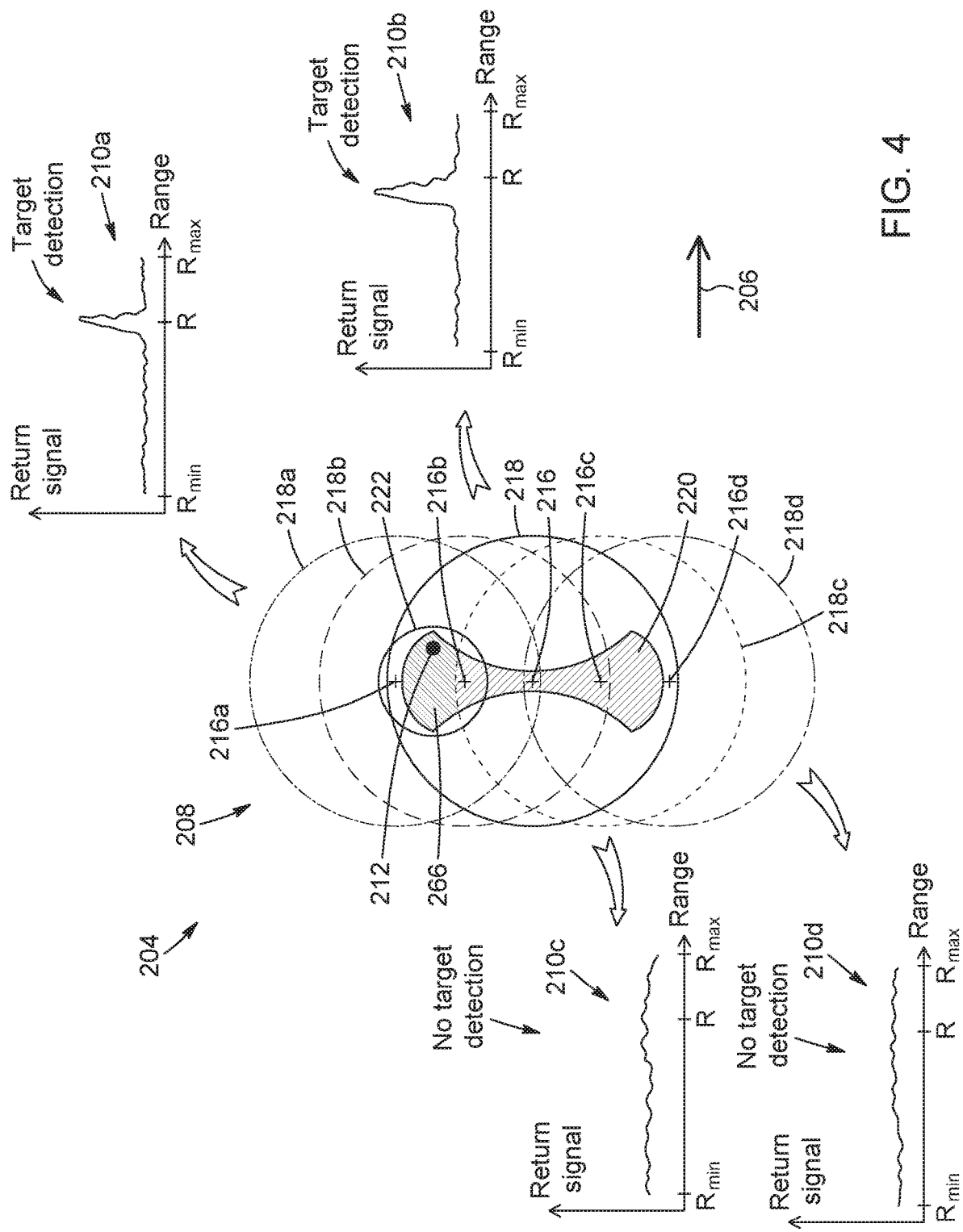
FIG. 4 is a schematic representation of a refinement procedure for estimation of the target angular location involving scanning the scene with a wide-angle search signal, in accordance with another embodiment.

Referring also to FIG. 4, there is depicted a schematic representation of an example of a refined procedure for estimation of the target angular location, which is carried out during steps 108 and 110 of the method 100 of FIG. 1. As noted above, using a stationary, wide-angle search signal 208 for target detection and localization may result in an initial estimate of the target angular location 220, which may not be sufficiently accurate in some applications. The initial estimate of the target angular location 220 is represented by the larger hatched region in FIG. 4. To refine the initial target angular location estimated at step 106, the procedure depicted in FIGS. 2B and 4 first involves the step 108 of scanning the search signal 208 over a plurality of additional search directions 216a-216d in the vicinity of the search direction 216 at which the target 212 was initially detected, and detecting a plurality of additional search return signals 210a-210d from the scene 204. The additional search directions 216a-216d can be selected or otherwise determined such that, at the estimated target range, the angular field of illumination 218a-218d of the search signal 208 associated with each additional search direction 216a-216d overlaps at least partly with the angular field of illumination 218 associated with the initial search direction 216. In FIG. 4, the search signal 208 is scanned along a direction that is substantially perpendicular to the travel path 206 of the platform 206. This is because the target angular location 220 estimated at step 106 is often more accurate in the along-track direction than in the across-track direction. Thus, the combination of the additional search directions 216a-216d forms a pattern that extends along the vertical direction in FIG. 4.

It is appreciated that in FIG. 4, the initial field of illumination 218 and the additional fields of illumination 218a-218d are depicted in a constant-range surface located at the estimated target range. It is also appreciated that depending on the relative speed between the detected target 212 and the platform 202 during the time of recording the initial and additional search return signals 210, 210a-210d, it may be envisioned to compensate for variations in the scene while carrying out the method 100, for example, to ensure that all the additional fields of illumination 218a-218d at least partly overlap the initial field of illumination 218.

Referring still to FIGS. 1, 2B, and 4, the procedure also includes the step 110 of refining, from the plurality of additional search return signals 210a-210d, the target angular location 220 estimated at step 106. The refinement procedure can involve analyzing the plurality of additional search return signals 210a-210d to detect target returns therein. Then, depending on whether a target return is detected in each of the plurality of additional search return signals 210a-210d, the angular location of the target 212 can be narrowed down to a smaller, refined target angular location 266 within the target angular location 220 initially estimated at step 106. The refined target angular location 266 is represented by the smaller hatched region in FIG. 4. For example, in FIG. 4, it is seen that a target return is detected in the additional search return signals 210a-210b but not in the additional search return signals 210c-210d. Thus, using signal processing techniques, the detected target 212 can be estimated to be in a refined target angular location 266 within the initially estimated target angular location 220. In particular, the refined angular location 266 in FIG. 4 corresponds to the portion of the initial target angular location 220 that both overlaps the fields of illumination 218a-218b of the additional search directions 216a-216b and does not overlap the fields of illumination 218c-218d of the additional search directions 216c-216d.

For clarity, only four additional search directions 216a-216d are depicted in FIG. 4. However, depending on the application, the number of additional search directions can take on a number of values, for example, between ten and twenty values in some embodiments. The number of additional search directions used in a given application can depend on a number of factors including, but not limited to, the estimated range of the detected target 212, the speed of the platform 202 with respect to the detected target 212, and the desired or required degree of accuracy in the target angular location estimation. In particular, in some implementations, the accuracy in the target angular location estimation may depend on the desired or required angular field of illumination 222 with which SA imaging of the detected target will be performed. That is, in such implementations, the refinement procedure for estimating the target angular location may be performed until the size of the refined target angular location 220 matches or fits within the SA angular field of illumination 222. It is appreciated that while the footprints of the initial and additional fields of illumination 218, 218a-218d and the footprint of the SA angular field of illumination 222 are depicted in FIG. 4 as circles for simplicity, they may have other shapes in other embodiments.

Figure 5:
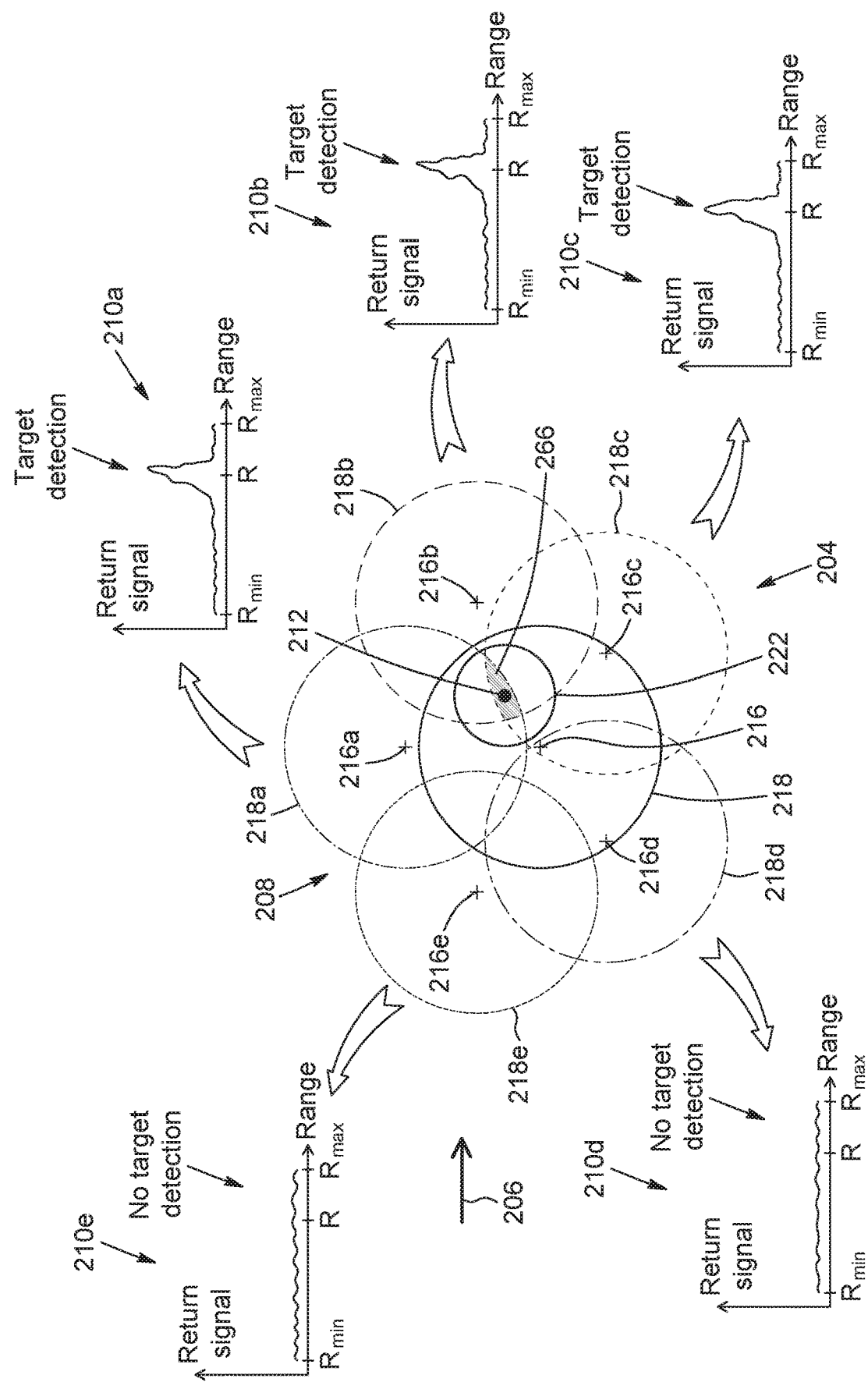
FIG. 5 is another schematic representation of a refinement procedure for estimation of the target angular location involving scanning the scene with a wide-angle search signal, in accordance with another embodiment.

It is also appreciated that the search signal 208 may be scanned over the additional pointing directions 216a-216d according to various scanning patterns in addition to the one depicted in FIG. 4. Namely, in FIG. 4, the step 110 of refining the estimated angular location 220 of the target 212 involves refining the estimated angular location 220 of the target 212 with respect to a direction substantially perpendicular to the travel path 206. However, referring to FIG. 5, in other implementations, the search signal 208 may be scanned along both a direction parallel to the travel path 206 and a direction perpendicular to the travel path 206 to determine a refined target angular location 266 that is refined with respect to both its along-track and its across-track components. In FIG. 5, the search signal 208 is scanned along five additional search direction 216a-216e, thereby generating five additional search return signals 210a-210e. Then, the process of refining the target angular location estimation can include a step of refining, from the plurality of additional return signals 210a-210e, an initial target angular location estimate. The process can involve analyzing the plurality of additional return signals 210a-210e to detect target returns therein. For example, in FIG. 5, it is seen that a target return is detected in the additional return signals 210a-210c but not in the additional return signals 210d-210e. Thus, using signal processing techniques, the detected target 212 can be estimated to be in a refined target angular location 266 within the initial field of illumination 218, corresponding to the portion of the initial field of illumination 218 that both overlaps the fields of illumination 218a-218c and does not overlap the fields of illumination 218d-218e.

Referring now to FIGS. 1 and 2C, the method 100 includes a step 112 of generating an SA transmission signal 224 and an LO signal (not shown in FIG. 2C; see LO signal 238 in FIGS. 6 and 7), where the SA transmission signal 224 and the LO signal are generated with a time delay relative to each other based on the range R of the detected target 212 estimated at step 106. In SAL applications, the SA transmission signal 224 and the LO signal may be chirped signals, that is, signals whose center frequencies vary over the signal pulse durations. Depending on the application and the configuration of the imaging system 200, the LO signal can be generated either before or after the SA transmission signal 224, and the time delay between the two signals can be controlled using various techniques. Non-limiting examples of techniques where the LO time delay can be adjusted in real-time or near real-time in accordance with target range variations are disclosed in co-assigned U.S. Pat. No. 10,564,268 issued on Feb. 18, 2020, the disclosure of which is incorporated herein by reference in its entirety.

The method 100 also includes a step 114 of illuminating the scene 204 along an imaging direction 226 with the SA transmission signal 224 transmitted from the platform 202, where the imaging direction 226 is based on the estimated angular location of the target 212. The SA transmission signal 224 may be characterized by an SA angular field of illumination 222. The SA angular field of illumination 222, which is related to the beam divergence of the SA transmission signal 224, determines the size of the SA transmission signal footprint at a given range. As noted above, the SA angular field of illumination 222 may be narrower than the search angular field of illumination 218. That is, the step 102 of illuminating the scene 204 with the search signal 208 may include controlling the beam divergence of the search signal 208 and the step 114 of illuminating the scene 204 with the SA transmission signal 224 may include controlling the beam divergence of the SA transmission signal 224 to be less than that of the search signal 208.

In embodiments where the refinement procedure for estimating the target angular location is performed, controlling the imaging direction 226 of the SA transmission signal 224 can include further adjusting the imaging direction 226 of the SA transmission signal 224 based on the refined estimated angular location 266 of the detected target 212, for example, to ensure that the SA angular field of illumination 222 encompasses the refined target angular location 266 (see, e.g., FIGS. 4 and 5).

It is appreciated that different SA operation modes may be used including, but not limited to, a spotlight mode, a scanning mode, a side-looking stripmap mode, a forward-squinted side-looking stripmap mode, and a backward-squinted side-looking stripmap mode. Also, depending on the application, the method 100 may or may not continue using the search signal 208 for target detection while performing SA imaging with the SA transmission signal 224.

Referring still to FIGS. 1 and 2C, the method further includes a step 116 of receiving, on the platform 202, an SA return signal 228 produced by reflection of the SA transmission signal 224 from the detected target 212, a step 118 of mixing the SA return signal 228 with the LO signal to generate SA signal data, for example, using optical heterodyne detection with chirped signals; and a step 120 of generating an SA image of the detected target from the SA signal data. It is appreciated that the general principles underlying the generation of SA images from SA signal data are known in the art, and need not be described in greater detail herein.

Depending on the application, the SA image can be a two-dimensional (2D) or a three-dimensional (3D) SA image. In the present description, a 2D SA image of a target region refers to a 2D pixel array, where one of the dimensions may be an along-track dimension (e.g., along an azimuth direction) and the other dimension may be an across-track dimension (e.g., along a slant-range or a ground-range direction). Each pixel of the array may be associated with a respective area of the target region and provides a complex number (amplitude and phase information) representing the surface reflectance of the associated area. A 3D SA image of a target region also refers to a 2D pixel array, for example, having an along-track dimension and an across-track dimension, and where each pixel of the array is associated with a respective area of the target region. Each pixel of the 3D image may have a value representative of the local height or elevation of the associated area of the target region in addition to, or instead of, providing reflectance-based information. Non-limiting examples of techniques for 3D SA imaging are disclosed in co-assigned U.S. Pat. No. 10,388,006 issued on Aug. 20, 2019 and co-assigned U.S. Pat. No. 10,698,113 issued on Jun. 30, 2020, the disclosures of which are incorporated herein by reference in their entirety.

Figure 6:
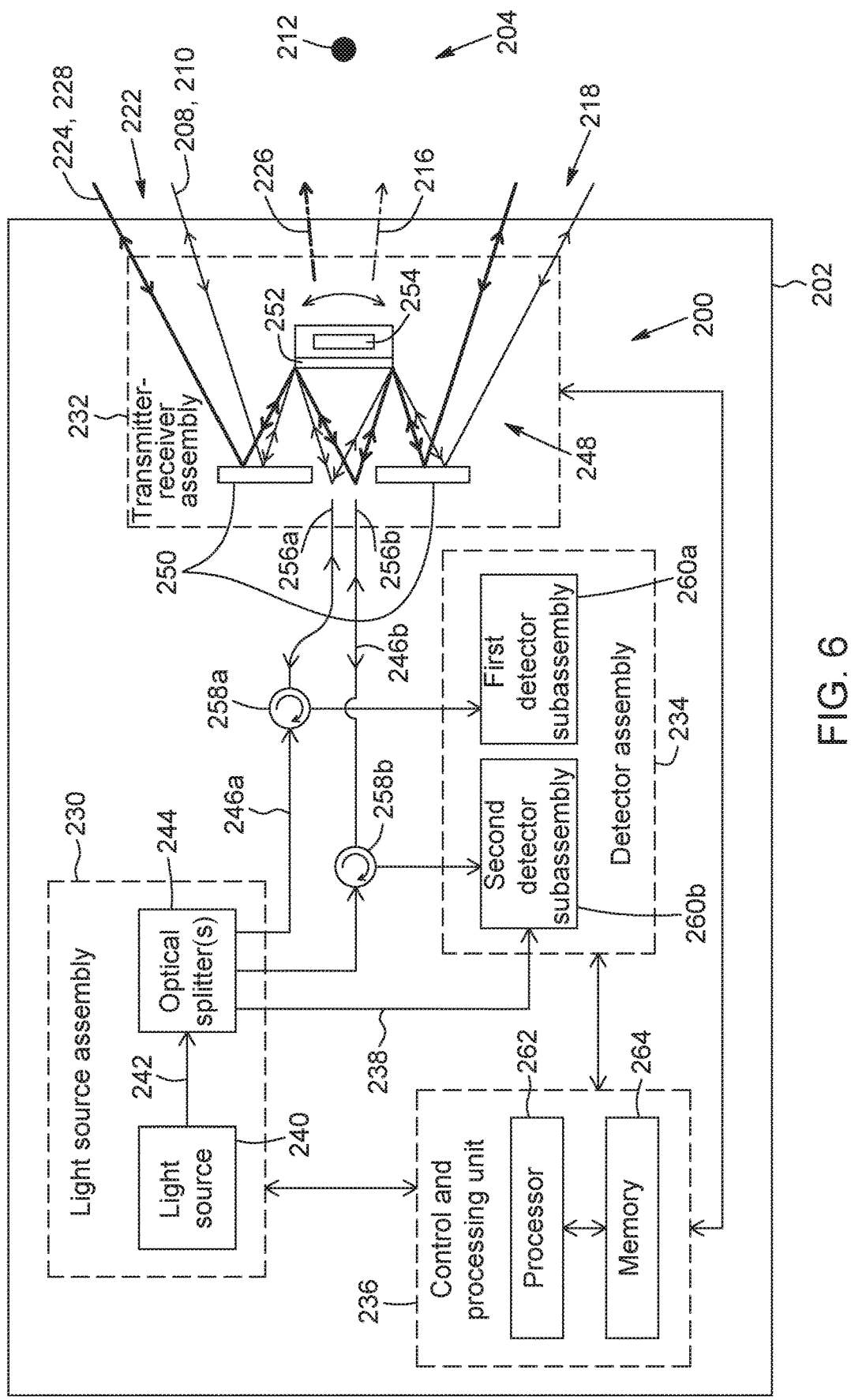
FIG. 6 is a schematic block diagram of a system for detection and SA imaging of a target, in accordance with another embodiment.

Referring to FIG. 6, there is illustrated a schematic block diagram of an embodiment of a system 200 for detection, localization, and SA imaging of a target 212 present in a scene 204 from a platform 202 in relative movement with respect to the scene 204. The system 200 of FIG. 6 may correspond to the one mounted on the platform 202 in FIGS. 2A to 2C, and be used to implement the method 100 of FIG. 1. In FIG. 6, the system 200 is configured for SAL applications, for example, in the near-infrared. However, as noted above, other embodiments can be configured to perform SA imaging in other wavelength ranges.

The system 200 of FIG. 6 generally includes a light source assembly 230, a transmitter-receiver assembly 232, a detector assembly 234, and a control and processing unit 236. These and other possible components of the system 200 are described in greater detail below.

The light source assembly 230 is mounted on the platform 202 and is configured to generate a search signal 208, an SA transmission signal 224, and an LO signal 238. The light source assembly 230 may be embodied by any appropriate device or combination of devices capable of generating the search signal 208, the SA transmission signal 224, and the LO signal 238 with suitable characteristics for enabling their use in the present techniques. By way of example, in SAL imaging applications assisted by TOF-lidar-based target detection and localization, the signals mentioned above can have a center frequency ranging from about 30 terahertz (THz) to about 300 THz, for example, 193 THz, corresponding to a wavelength of 1.55 µm, although values outside this range are possible in other embodiments.

The light source assembly 230 can include a light source 240 configured to generate a source light signal 242, and one or more optical splitters 244, for example, fiber-optic splitters, configured to split the source light signal 242, or a portion thereof, into the search signal 208, the SA transmission signal 224, and the LO signal 238. In the present description, the term "optical splitter" is intended to refer to a device capable of dividing an input light signal into two or more signal parts. The signal parts may or may not be all identical. The optical splitting device may be configured to perform a power splitting, a spectral splitting, or a temporal splitting of the input light signal, or any combination thereof. For example, in some implementations, the light source assembly 230 is configured to perform a temporal splitting of the source light signal 242. During a first time interval, corresponding to a target detection phase, the light source assembly 230 generates the source light signal 242 as the search signal 208. During a second time interval, corresponding to an SA imaging phase, the light source assembly 230 generates the SA transmission signal 224 and the LO signal 238 from the source light signal 242 via power splitting. It is appreciated that while the light source assembly 230 depicted in FIG. 6 includes a single light source 240, this may not be the case in other embodiments. In particular, each of the search signal 208, the SA transmission signal 224, and the LO signal 238 may be generated using a dedicated light source, which may or may not be identical to the other dedicated light source or sources.

Depending on the application, the light source 240 may be embodied by a variety of devices or combination of devices. Non-limiting examples of possible light sources include gas lasers; solid-state lasers, including fiber lasers; semiconductor-based lasers, including laser diodes; dye lasers; and non-laser sources, such as light-emitting diodes. Laser sources are generally employed in SAL systems. For example, in some SAL implementations, the light source assembly 230 may include a pulsed fiber laser 240 provided with a directly modulated laser diode configured to perform a linear or nonlinear frequency modulation, or chirp, of the source light signal 242. Alternatively, the light source assembly 230 may include a continuous-wave light source 240 whose output is coupled to an external waveform modulator or phase shifter. As can be appreciated, the choice of the light source can be based on various factors including, but not limited to, its wavelength; irradiance; spatial, temporal, and spectral profiles; beam quality and divergence; degree of coherence; compactness; reliability; and, for a pulsed source, its pulse characteristics, such as its peak power, repetition rate, duration, temporal shape, and center wavelength. Depending on the application, the search signal 208, the SA transmission signal 224, and the LO signal 238 may be individually modulated or otherwise conditioned downstream of the light source assembly 230.

Referring still to FIG. 6, the system 200 may include optical fibers to transmit the search signal 208, the search return signal 210, the SA transmission signal 224, the SA return signal 228, and the LO signal 238 between the different components of the system 200. By way of example, the system 200 may include one or more multimode optical fibers 246a configured to transmit the search signal 208 from the light source assembly 230 to the transmitter-receiver assembly 232 and transmit the search return signal 210 from the transmitter-receiver assembly 232 to the detector assembly 234. The use of multimode fibers can improve the light collection process. The system 200 may also include one or more single-mode optical fibers 246b, which may be polarization-maintaining, configured to transmit the SA transmission signal 224 from the light source assembly 230 to the transmitter-receiver assembly 232 and transmit the SA return signal 228 from the transmitter-receiver assembly 232 to the detector assembly 234. The use of single-mode fibers can improve the coherent detection process. However, in other implementations, bulk optical components could be used instead of, or in addition to, fiber-based components.

Referring still to FIG. 6, the transmitter-receiver assembly 232 is mounted on the platform 202 and configured for: illuminating the scene 204 with the search signal 208 along the search direction 216; receiving a search return signal 210 produced by reflection of the search signal 208 from a target 212 present in the scene 204; illuminating the scene 204 with the SA transmission signal 224; and receiving an SA return signal 228 produced by reflection of the SA transmission signal 224 from the target 212. In some embodiments, the transmitter-receiver assembly 232 may be configured to control the beam divergence of the SA transmission signal 224 to be less than the beam divergence of the search signal 208. It is appreciated that the transmitter-receiver assembly 232 can include a number of transmitter, receiver and/or transceiver optics, such as lenses, mirrors, optical filters, and the like, configured to direct, shape, filter, or otherwise condition the search signal 208, the search return signal 210, the SA transmission signal 224, and the SA return signal 228 before transmission to or after reception from the scene 204.

In the illustrated embodiment, the transmitter-receiver assembly 232 includes a telescope 248 with a primary mirror 250 and a secondary mirror 252 having a relative orientation to each other. The two-mirror telescope 248 in FIG. 6 is used for illumination and collection in both target detection and SA imaging phases. That is, the two-mirror telescope 248 is configured to receive the search signal 208 and the SA transmission signal 224 from the light source assembly 230 to direct them toward the scene 204 and to receive the search return signal 210 and the SA return signal 228 from the scene 204 and direct them toward the detector assembly 234. It is appreciated, however, that the transmitter-receiver assembly 232 may be implemented in a variety of configurations depending on the application. For example, in some embodiments, the transmitter-receiver assembly 232 can include separate subassemblies for transmission and reception and/or separate subassemblies for target detection (e.g., associated with a lidar subsystem) and SA imaging (e.g., associated with a SAL subsystem), as described in further detail below with reference to FIG. 7.

In FIG. 6, the control and processing unit 236 is operatively coupled to the telescope 248 and configured to adjust the search direction 216 of the search signal 208 and the imaging direction 226 of the SA transmission signal 224 by controlling the relative orientation between the primary mirror 250 and the secondary mirror 252. For this purpose, the telescope 248 in FIG. 6 includes a tip tilt mechanism 254 integrated, for example, in the secondary mirror 252 to control the search direction 216 of the search signal 208 (e.g., during the refinement procedure for the target angular location and, more generally, at any time prior to or during target detection and localization) and the imaging direction 226 of the SA transmission signal 224 (e.g., as a result of the refinement procedure for the target angular location and, more generally, at any time prior to or during SA imaging). It is appreciated, however, that a variety of mirror-based and non-mirror-based scanning, tilting or steering devices and mechanisms can be used in other embodiments to vary the pointing directions 216, 226 of the search signal 208 and the SA transmission signal 224. It is also appreciated that changing the relative orientation between the primary mirror 250 and the secondary mirror 252 may be achieved, as the case may be, by moving only the primary mirror 250, only the secondary mirror 252, as in FIG. 6, or both the primary mirror 250 and the secondary mirror 252.

Referring still to FIG. 6, the transmitter-receiver assembly 232 is optically coupled to the optical fibers 246a-246b. The ends 256a-256b of the optical fibers 246a-246b may be substantially parallel to each other and located at or near the focal plane of the telescope 248. The transverse offset between the fiber ends 256a-256b may be accounted for when providing relative adjustment between the search direction 216 of the search signal 208 and the imaging direction 226 of the SA transmission signal 224. As can be appreciated, optical circulators 258a-258b may be provided to separate the counterpropagating signals 208-210 and 224-228 traveling along the optical fibers 246a-246b.

Figure 7:
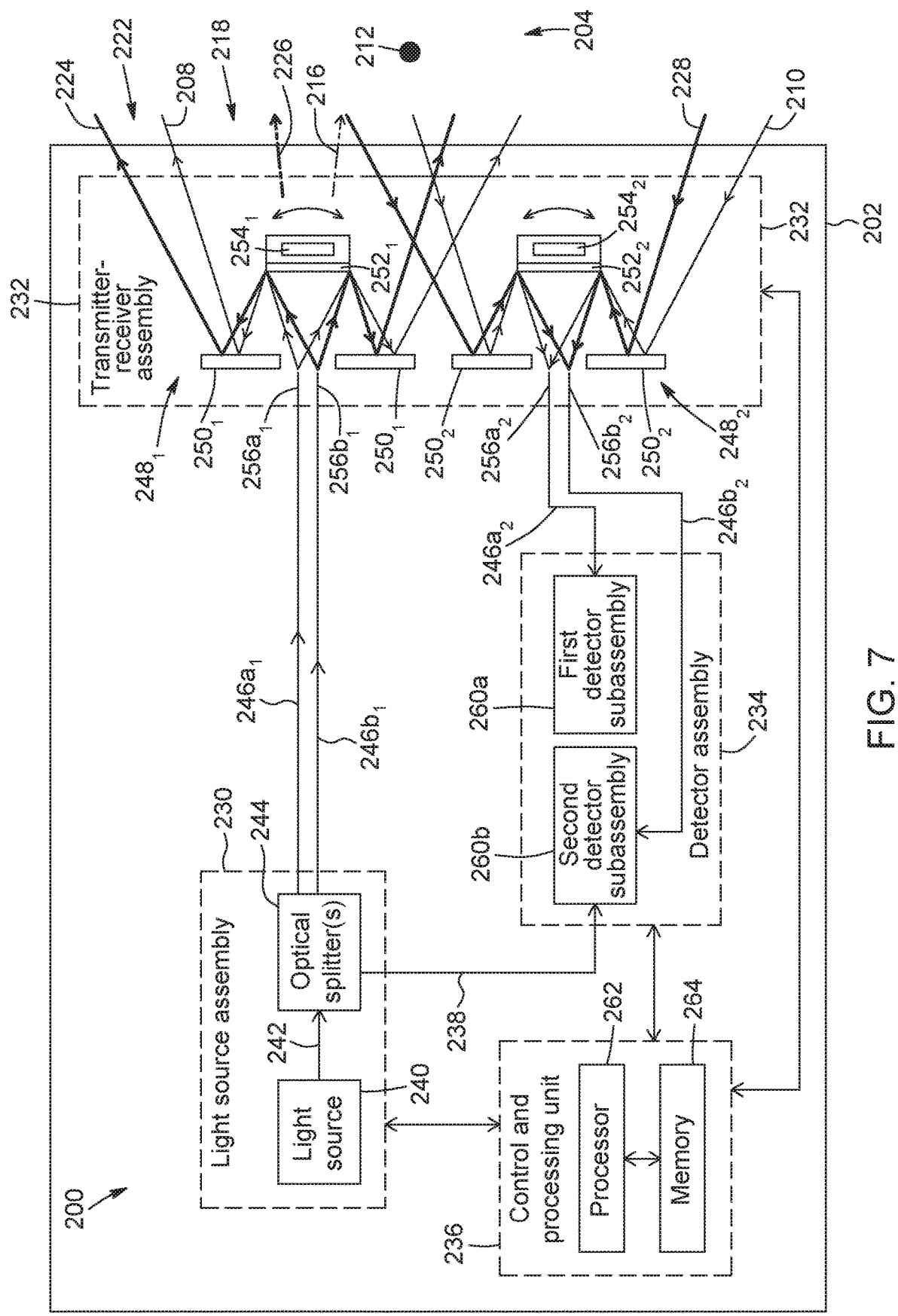
FIG. 7 is schematic block diagram of another system for detection and SA imaging of a target, in accordance with another embodiment.

Referring to FIG. 7, there is illustrated a schematic block diagram of another embodiment of a system 200 for detection, localization, and SA imaging of a target 212 present in a scene 204 from a platform 202 in relative movement with respect to the scene 204. The embodiment of FIG. 7 shares several features with the embodiment of FIG. 6, which need not be described again other than to highlight differences between them. In FIG. 7, the transmitter-receiver assembly 232 includes a transmission telescope $248_1$ and a collection telescope $248_2$. Each telescope $248_1$, $248_2$ has a primary mirror $250_1$, $250_2$ and a secondary mirror $252_1$, $252_2$. The relative orientation between the primary mirror $250_1$, $250_2$ and the secondary mirror $252_1$, $252_2$ is adjustable. For this purpose, each telescope $248_1$, $248_2$ may include a tip tilt mechanism $254_1$, $254_2$ integrated in the secondary mirror $252_1$, $252_2$ and operatively coupled to the control and processing unit 236. The transmission telescope $248_1$ is configured for projecting the search signal 208 and the SA transmission signal 224 toward the scene 204. Meanwhile, the collection telescope $248_2$ is configured for collecting the search return signal 210 and the SA return signal 228 from the scene 204.

The transmission telescope $248_1$ is coupled to optical fibers $246a_1$, $246b_1$. The ends $256a_1$, $256b_1$ of the optical fibers $246a_1$, $246b_1$ are substantially parallel to each other and located at or near the focal plane of the transmission telescope $248_1$. The transmission telescope $248_1$ is configured to receive the search signal 208 from the optical fiber $246a_1$ and receive the SA transmission signal 224 from the optical fiber $246b_1$. The transverse offset between the fiber ends $256a_1$, $256b_1$ can be accounted for when providing relative adjustment between the search direction 216 of the search signal 208 and the imaging direction 226 of the SA transmission signal 224. The search direction 216 of the search signal 208 and the imaging direction 226 of the SA transmission signal 224 may be controlled by the control and processing unit 236 via the tip tilt mechanism $254_1$ provided in the secondary mirror $252_1$. The collection telescope $248_2$ is coupled to optical fibers $246a_2$, $246b_2$. The ends $256a_2$, $256b_2$ of the optical fibers $246a_2$, $246b_2$ are substantially parallel to each other and located at or near the focal plane of the collection telescope $248_2$. The collection telescope $248_2$ is configured to transmit the search return signal 210 to the optical fiber $246a_2$ and transmit the SA return signal 228 to the optical fiber $246b_2$.

Returning to FIG. 6, the detector assembly 234 is mounted on the platform 202 and configured to detect the search return signal 210. The detector assembly 234 is also configured to detect the SA return signal 228 by mixing it with the LO signal 238 to generate SA signal data. In the illustrated embodiment, the detector assembly 234 includes a first detector subassembly 260a configured to detect the search return signal 210 and a second detector subassembly 260b configured to detect the SA return signal 228. As can be appreciated, other detection configurations may be used in other embodiments.

The first detector subassembly 260a may include a photon-counting detector, for example, a single-photon counting detector, or other types of photodetectors, for example, PIN photodiodes. Non-limiting examples of photon-counting detectors include single-element (non-imaging) optical detectors, for instance, and solid-state photodetectors, such as avalanche photodiodes (APDs), silicon photomultipliers (SiPMs), and silicon photodiodes (SiPDs), as well as photomultiplier tubes (PMTs). It is appreciated, however, that in other embodiments the first detector subassembly 260a may detect the search return signal 210 using an array of detectors (e.g., an imager disposed in the focal plane of the two-mirror telescope 248). Non-limiting examples of array detectors include charge-coupled-device (CCD) imagers, complementary metal-oxide-semiconductor (CMOS) imagers, charge-injection-device (CID) imagers, and single-photon avalanche detector (SPAD) arrays.

The second detector subassembly 260b may include an optical heterodyne detector, as commonly found in SAL systems. Optical heterodyne detection can be performed by coherent mixing of the SA return signal 228 with the LO signal 238 before detection of the mixed signals with one or more photodetectors, for example, single-element detectors such as PIN photodiodes, PMTs, APDs, SiPMs, and SiPDs, although array detectors may be used in some implementations, for example, in bistatic SA imaging. The one or more photodetectors can generate one or more electrical signals. Each electrical signal contains, as a result of the mixing of the SA return signal 228 with the LO signal 238, a beatnote whose frequency depends, in the case of chirped signals, on the optical path length difference, or equivalently the time delay, between the mixed signals. In the present techniques, this time delay can be controlled based on the estimated range R of the detected target 212 determined from the search return signal 210 to ensure that the spectrum of the beatnote remains within the bandwidth of the one or more detectors of the second detector subassembly 260b. The one or more electrical signals may be digitally sampled and stored as SA signal data. It is appreciated that the general principles underlying optical heterodyne detection are generally known in the art, and need not be described in greater detail herein.

Referring still to FIG. 6, the control and processing unit 236 is operatively coupled to the light source assembly 230, the transmitter-receiver assembly 232, and the detector assembly 234 to control and coordinate, at least partly, their operation. The control and processing unit 236 may also be configured to process and analyze the detection data measured by the detector assembly 234. In FIG. 6, the control and processing unit 236 generally includes a processor 262 and a memory 264.

The control and processing unit 236 can be provided within one or more general purpose computers and/or within any other suitable computing devices, implemented in hardware, software, firmware, or any combination thereof, and connected to the components of the system 200 via appropriate wired and/or wireless communication links and ports. Depending on the application, the control and processing unit 236 may be integrated, partly integrated, or physically separate from the optical hardware of the system 200. Furthermore, it is appreciated that while the control and processing unit 236 is depicted in FIG. 6 as being physically located on the platform 202, this need not be the case in other embodiments. For example, in some embodiments, the control and processing unit 236 may be provided, at least partly, at another location, for example, a ground-based processing station.

The processor 262 may implement operating systems, and may be able to execute computer programs, also generally known as commands, instructions, functions, processes, software codes, executables, applications, and the like. It should be noted that although the processor 262 in FIG. 6 is depicted as a single entity for illustrative purposes, the term "processor" should not be construed as being limited to a single processor, and accordingly, any known processor architecture may be used. In some implementations, the processor 262 may include a plurality of processing units. Such processing units may be physically located within the same device. Alternatively, the processor 262 may represent processing functionality of a plurality of devices operating in coordination. For example, the processor 262 may include or be part of: a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 264, which can also be referred to as a "computer readable storage medium", is capable of storing computer programs and other data to be retrieved by the processor 262. In the present description, the terms "computer readable storage medium" and "computer readable memory" are intended to refer to a non-transitory and tangible computer product that can store and communicate executable instructions for the implementation of various steps of the methods disclosed herein. The computer readable memory may be any computer data storage device or assembly of such devices, including a random-access memory (RAM); a dynamic RAM; a read-only memory (ROM); a magnetic storage device, such as a hard disk drive, a solid state drive, a floppy disk, and a magnetic tape; an optical storage device, such as a compact disc (CD or CDROM), a digital video disc (DVD), and a Blu-Ray™ disc; a flash drive memory; and/or any other non-transitory memory technologies. A plurality of such storage devices may be provided, as can be appreciated by those skilled in the art. The computer readable memory may be associated with, coupled to, or included in a computer or processor configured to execute instructions contained in a computer program stored in the computer readable memory and relating to various functions associated with the computer.

The control and processing unit 236 may be configured to perform one or more of the following operations:
controlling the light source assembly 230 to generate the search signal 208;
controlling the transmitter-receiver assembly 232 to illuminate the scene 204 with the search signal 208 along the search direction 216;
estimating, from the search return signal 210 detected by the detector assembly 234, a range and an angular location of a target 212 present in the scene 204;
estimating the angular location of the target 212 with respect to a direction substantially parallel to the travel path 206;
controlling the transmitter-receiver assembly 232 to scan the search signal 208 over a plurality of additional search directions to produce a corresponding plurality of additional search return signals by reflection of the search signal 208 from the target 212, wherein, at the estimated range of the target 212, the angular field of illumination of the search signal 208 associated with each additional search direction overlaps at least partly with the angular field of illumination 218 of the search signal 208 associated with the search direction 216;
refining, from the plurality of additional search return signals, the estimated angular location of the target 212;
refining the estimated angular location of the target 212 with respect to a direction substantially perpendicular to the travel path 206;
controlling the light source assembly 230 to generate the SA transmission signal 224 and the LO signal 238 with a time delay therebetween, the time delay being based on the estimated range of the target 212;
controlling the transmitter-receiver assembly 232 to illuminate the scene 204 with the SA transmission signal 224 along an imaging direction 226, the imaging direction 226 being based on the estimated angular location of the target 212;
controlling the transmitter-receiver assembly 232 to adjust the imaging direction 226 of the SA transmission signal 224 based on the refined estimated angular location of the target 212; and
receiving the SA signal data from the detector assembly 234 and generating an SA image of the target 212 from the received SA signal data.

In accordance with another aspect of the present description, there is provided a non-transitory computer readable storage medium having stored thereon computer executable instructions for use with a system for detection and SA imaging of a target. The system is mounted on a platform in relative movement with respect to a scene and may include a light source assembly, a transmitter-receiver assembly, and a detector assembly, such as described herein. The computer executable instructions, when executed by a processor, cause the processor to perform various steps of a method for detection and SA imaging of a target such as described herein. By way of example, these steps may include one or more of the following operations: controlling the light source assembly to generate a search signal to illuminate the scene along a search direction to produce a search return signal by reflection of the search signal from a target present in the scene; estimating, from the search return signal, a range and an angular location of the target; controlling the light source assembly to generate an SA transmission signal and an LO signal with a time delay therebetween, the time delay being based on the estimated range of the target; controlling the transmitter-receiver assembly to illuminate the scene with the SA transmission signal along an imaging direction to produce an SA return signal by reflection of the SA transmission signal from the target, the imaging direction being based on the estimated angular location of the target; receiving SA signal data from the detector assembly resulting from a mixing of the SA return signal received by the transmitter-receiver assembly with the LO signal; and generating an SA image of the target from the SA signal data.

In some embodiments, the steps performed by the processor may further include: controlling the transmitter-receiver assembly to illuminate the scene with the SA transmission signal along an imaging direction to produce an SA return signal by reflection of the SA transmission signal from the target, the imaging direction being based on the estimated angular location of the target; receiving SA signal data from the detector assembly resulting from a mixing of the SA return signal received by the transmitter-receiver assembly with the LO signal; and generating an SA image of the target from the SA signal data.

In accordance with another aspect of the present description, there is provided a computer device for use with a system for detection and SA imaging of a target such as described herein. The computer device may include a processor and a non-transitory computer readable storage

The invention claimed is:

1. A method for detection and synthetic aperture (SA) imaging of a target present in a scene, the method comprising:
    performing a target detection phase using lidar remote sensing, the target detection phase comprising:
        illuminating the scene along a search direction with a lidar search signal transmitted from a platform in relative movement with respect to the scene along a travel path to search for the target in the scene, the lidar search signal having an angular field of illumination;
        receiving, on the platform, a search return signal produced by reflection of the lidar search signal from the target to detect the presence of the target in the scene; and
        estimating, from the search return signal, a range and an angular location of the target; and
    performing, following the target detection phase, an SA imaging phase using SA imaging, the SA imaging phase comprising:
        generating an SA transmission signal and a local oscillator (LO) signal with a time delay therebetween, the time delay being based on the range of the target estimated in the target detection phase using lidar remote sensing;
        illuminating the scene along an imaging direction with the SA transmission signal transmitted from the platform, the imaging direction being based on the angular location of the target estimated in the target detection phase using lidar remote sensing, the SA transmission signal used in the SA imaging phase having an angular field of illumination that is narrower than the angular field of illumination of the lidar search signal used in the target detection phase;
        receiving, on the platform, an SA return signal produced by reflection of the SA transmission signal from the target;
        mixing the SA return signal with the LO signal to generate SA signal data; and
        generating an SA image of the target from the SA signal data.

2. The method of claim 1, wherein estimating the angular location of the target comprises estimating the angular location of the target with respect to a direction substantially parallel to the travel path.

3. The method of claim 1, wherein the target detection phase further comprises steps of:
    scanning the lidar search signal over a plurality of additional search directions oriented with respect to the search direction, wherein, at the estimated range of the target, an angular field of illumination of the lidar search signal associated with each additional search direction overlaps at least partly with the angular field of illumination of the lidar search signal associated with the search direction;
    receiving a corresponding plurality of additional search return signals produced by reflection of the lidar search signal from the target; and
    refining, from the plurality of additional search return signals, the estimated angular location of the target; and
    wherein, in the SA imaging phase, the imaging direction of the SA transmission signal is adjusted based on the refined estimated angular location of the target.

4. The method of claim 3, wherein refining the estimated angular location of the target comprises refining the estimated angular location of the target with respect to a direction substantially perpendicular to the travel path.

5. The method of claim 1, comprising generating the SA transmission signal and the LO signal as chirped laser pulses having a center frequency in a range from 30 terahertz to 300 terahertz.

6. The method of claim 1, wherein the lidar search signal, the SA transmission signal, and the LO signal are generated using a same light source.

7. The method of claim 1, wherein the platform is a spacecraft and the target is a space object.

8. A system for detection and synthetic aperture (SA) imaging of a target present in a scene from a platform in relative movement with respect to the scene along a travel path, the system comprising:
    a light source assembly for mounting on the platform and configured to generate a lidar search signal, an SA transmission signal, and a local oscillator (LO) signal;
    a transmitter-receiver assembly for mounting on the platform and configured to:
        in a target detection phase using lidar remote sensing, illuminate the scene with the lidar search signal along a search direction and with an angular field of illumination to search for the target in the scene, and receive a search return signal produced by reflection of the lidar search signal from the target to detect the presence of the target in the scene; and
        in an SA imaging phase using SA imaging and following the target detection phase, illuminate the scene with the SA transmission signal with an angular field of illumination narrower than the angular field of illumination of the lidar search signal used in the target detection phase, and receive an SA return signal produced by reflection of the SA transmission signal from the target;
    a detector assembly for mounting on the platform and configured to detect, in the target detection phase, the search return signal and detect, in the SA imaging phase, the SA return signal by mixing the SA return signal with the LO signal to generate SA signal data;
    and a control and processing unit operatively coupled to the light source assembly, the transmitter-receiver assembly, and the detector assembly, the control and processing unit being configured to:
        in the target detection phase, estimate, from the search return signal, a range and an angular location of the target; and
        in the SA imaging phase:
            control the light source assembly to generate the SA transmission signal and the LO signal with a time delay therebetween, the time delay being based on the range of the target estimated in the target detection phase using lidar remote sensing;

control the transmitter-receiver assembly to illuminate the scene with the SA transmission signal along an imaging direction, the imaging direction being based on the angular location of the target estimated in the target detection phase using lidar remote sensing;

receive the SA signal data from the detector assembly; and generate an SA image of the target from the SA signal data.

9. The system of claim 8, wherein the control and processing unit is configured to estimate the angular location of the target with respect to a direction substantially parallel to the travel path.

10. The system of claim 8, wherein:
the transmitter-receiver assembly is configured to scan the lidar search signal over a plurality of additional search directions and receive a corresponding plurality of additional search return signals produced by reflection of the lidar search signal from the target, wherein, at the estimated range of the target, an angular field of illumination of the lidar search signal associated with each additional search direction overlaps at least partly with an angular field of illumination of the lidar search signal associated with the search direction; and
the control and processing unit is configured to refine, from the plurality of additional search return signals, the estimated angular location of the target and control the transmitter-receiver assembly to adjust the imaging direction of the SA transmission signal based on the refined estimated angular location of the target.

11. The system of claim 8, wherein the control and processing unit is configured to refine the estimated angular location of the target with respect to a direction substantially perpendicular to the travel path.

12. The system of claim 8, wherein the light source assembly comprises at least one laser source configured to generate the SA transmission signal and the LO signal as chirped laser pulses having a center frequency in a range from 30 terahertz to 300 terahertz.

13. The system of claim 8, further comprising multimode optical fibers configured to transmit the lidar search signal from the light source assembly to the transmitter-receiver assembly and transmit the search return signal from the transmitter-receiver assembly to the detector assembly, and single-mode optical fibers configured to transmit the SA transmission signal from the light source assembly to the transmitter-receiver assembly and transmit the SA return signal from the transmitter-receiver assembly to the detector assembly.

14. The system of claim 8, wherein:
the transmitter-receiver assembly comprises a telescope configured to receive the lidar search signal and the SA transmission signal from the light source assembly and comprising a primary mirror and a secondary mirror having a relative orientation to each other; and the control and processing unit is operatively coupled to the telescope and configured to adjust the search direction of the lidar search signal and the imaging direction of the SA transmission signal by controlling the relative orientation between the primary mirror and the secondary mirror.

15. The system of claim 8, wherein the detector assembly comprises a photon counting detector configured to detect the search return signal and an optical heterodyne detector configured to detect the SA return signal.

16. A non-transitory computer readable storage medium having stored thereon computer executable instructions for use with a system for detection and synthetic aperture (SA) imaging of a target present in a scene, the system being mounted on a platform in relative movement with respect to the scene and comprising a light source assembly, a transmitter-receiver assembly, and a detector assembly, wherein the computer executable instructions, when executed by a processor, cause the processor to:

perform a target detection phase using lidar remote sensing, the target detection phase comprising steps of:
controlling the light source assembly to generate a lidar search signal;
controlling the transmitter-receiver assembly to illuminate the scene with the lidar search signal along a search direction and with an angular field of illumination to produce a search return signal by reflection of the lidar search signal from the target-to detect the presence of the target in the scene; and
estimating, from the search return signal, a range and an angular location of the target; and perform, using SA imaging and following the target detection phase, an SA imaging phase, the SA imaging phase comprising steps of:
controlling the light source assembly to generate an SA transmission signal and a local oscillator (LO) signal with a time delay therebetween, the time delay being based on the range of the target estimated in the target detection phase using lidar remote sensing;
controlling the transmitter-receiver assembly to illuminate the scene with the SA transmission signal along an imaging direction and with an angular field of illumination narrower than the angular field of illumination of the lidar search signal used in the target detection phase to produce an SA return signal by reflection of the SA transmission signal from the target, the imaging direction being based on the angular location of the target estimated in the target detection phase using lidar remote sensing;
receiving SA signal data from the detector assembly resulting from a mixing of the SA return signal received by the transmitter-receiver assembly with the LO signal;
and generating an SA image of the target from the SA signal data.

17. The non-transitory computer readable storage medium of claim 16, wherein the computer executable instructions, when executed by the processor, further cause the processor to perform steps of:

controlling, in the target detection phase, the transmitter-receiver assembly to scan the lidar search signal over a plurality of additional search directions to produce a corresponding plurality of additional search return signals by reflection of the lidar search signal from the target, wherein, at the estimated range of the target, an angular field of illumination of the lidar search signal associated with each additional search direction overlaps at least partly with an angular field of illumination of the lidar search signal associated with the search direction;

refining, from the plurality of additional search return signals, the estimated angular location of the target; and controlling, in the SA imaging phase, the transmitter-receiver assembly to adjust the imaging direction of the SA transmission signal based on the refined estimated angular location of the target.

18. A computer device for use with or in a system for detection and synthetic aperture (SA) imaging of a target, the computer device comprising:
  a processor; and
  the non-transitory computer readable storage medium of claim 16, the non-transitory computer readable storage medium being operatively coupled to the processor.

\* \* \* \* \*